Aug. 2, 1966  A. M. MIDIS ETAL  3,263,625
ELECTRICAL CONTROL SYSTEMS FOR POINT-TO-POINT TRANSIT SYSTEMS
Filed Nov. 29, 1961  12 Sheets-Sheet 1
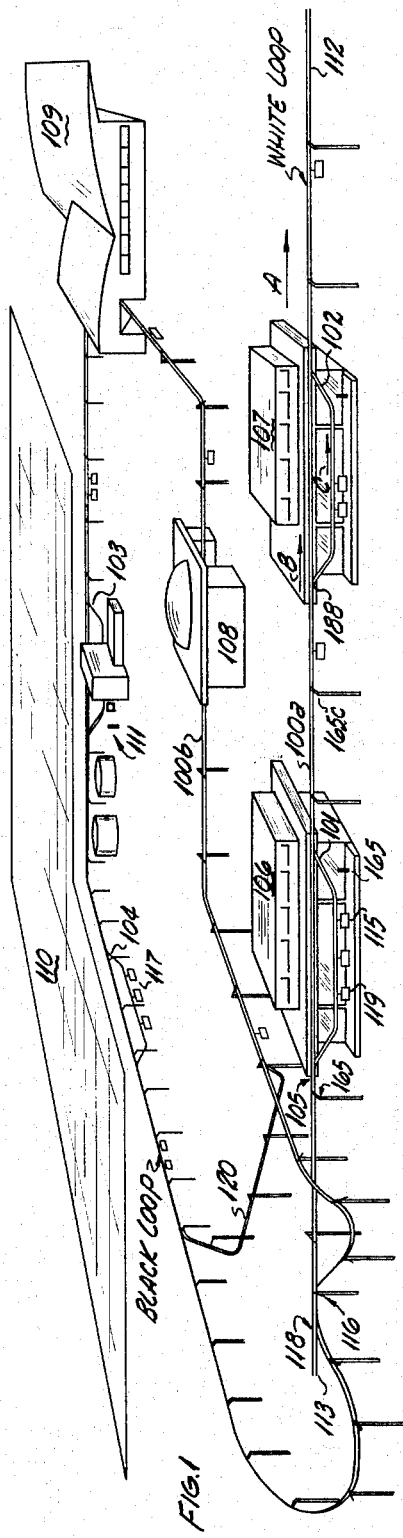
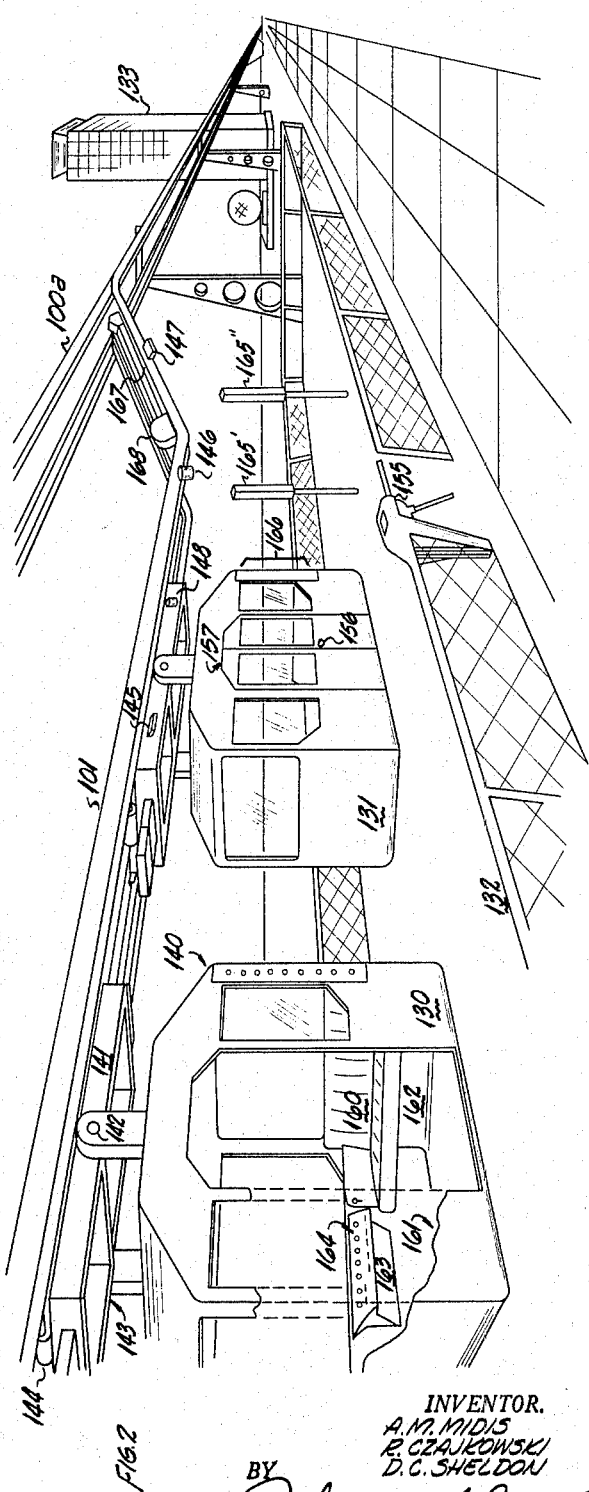
INVENTOR.
A. M. MIDIS
R. CZAJKOWSKI
D. C. SHELDON
BY
ATTORNEY

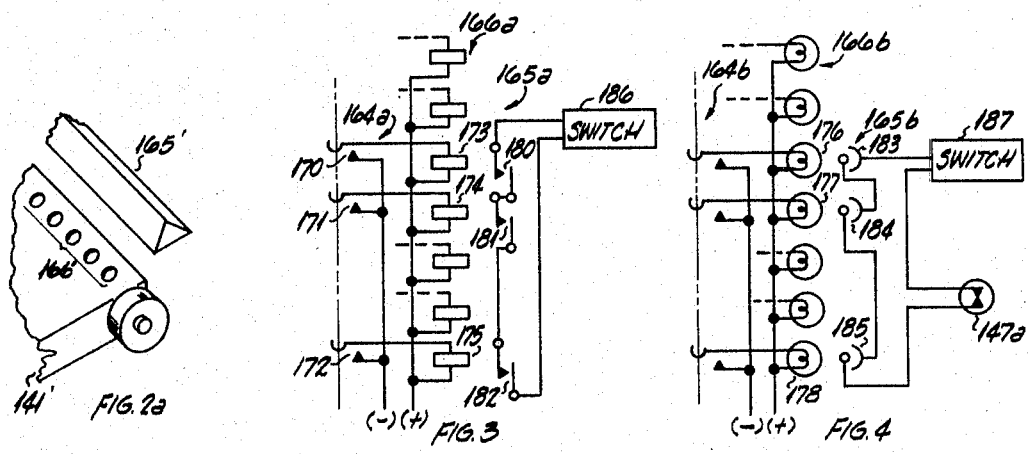
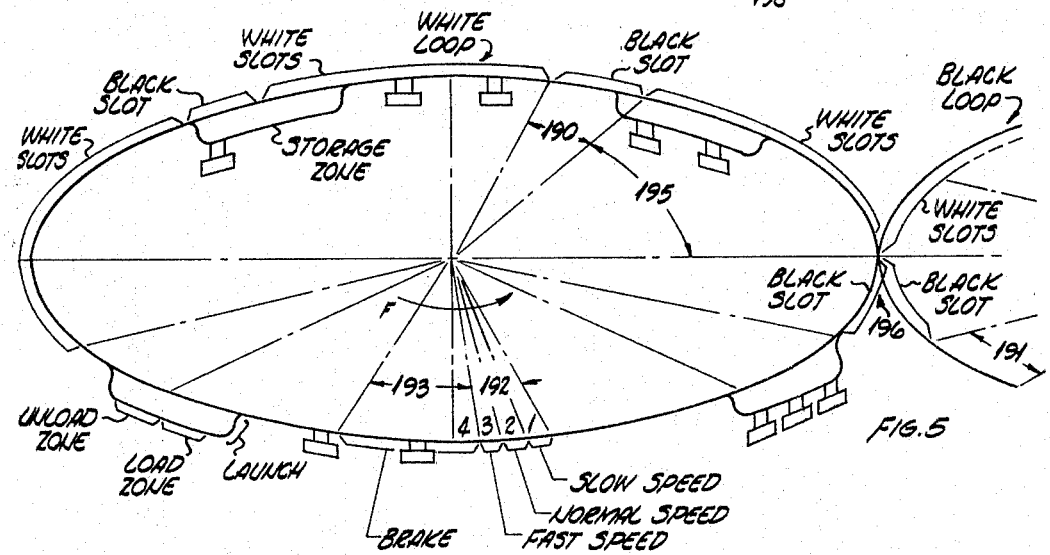
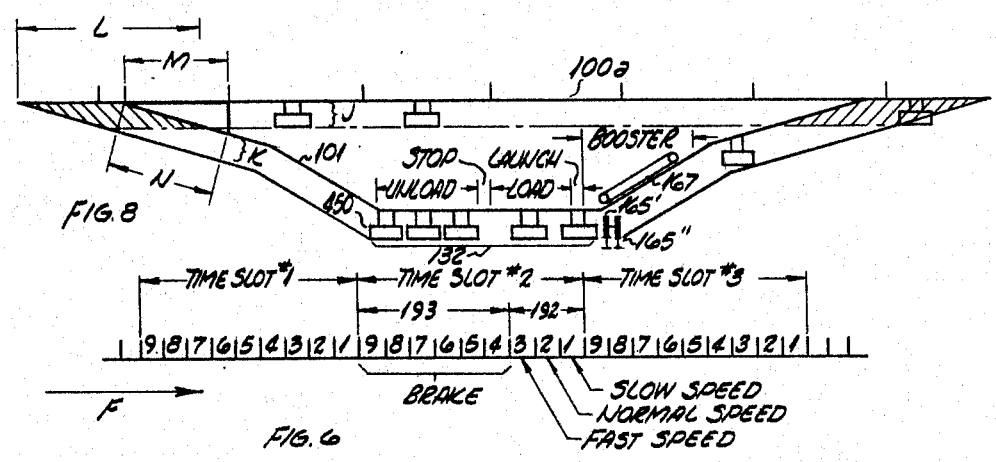

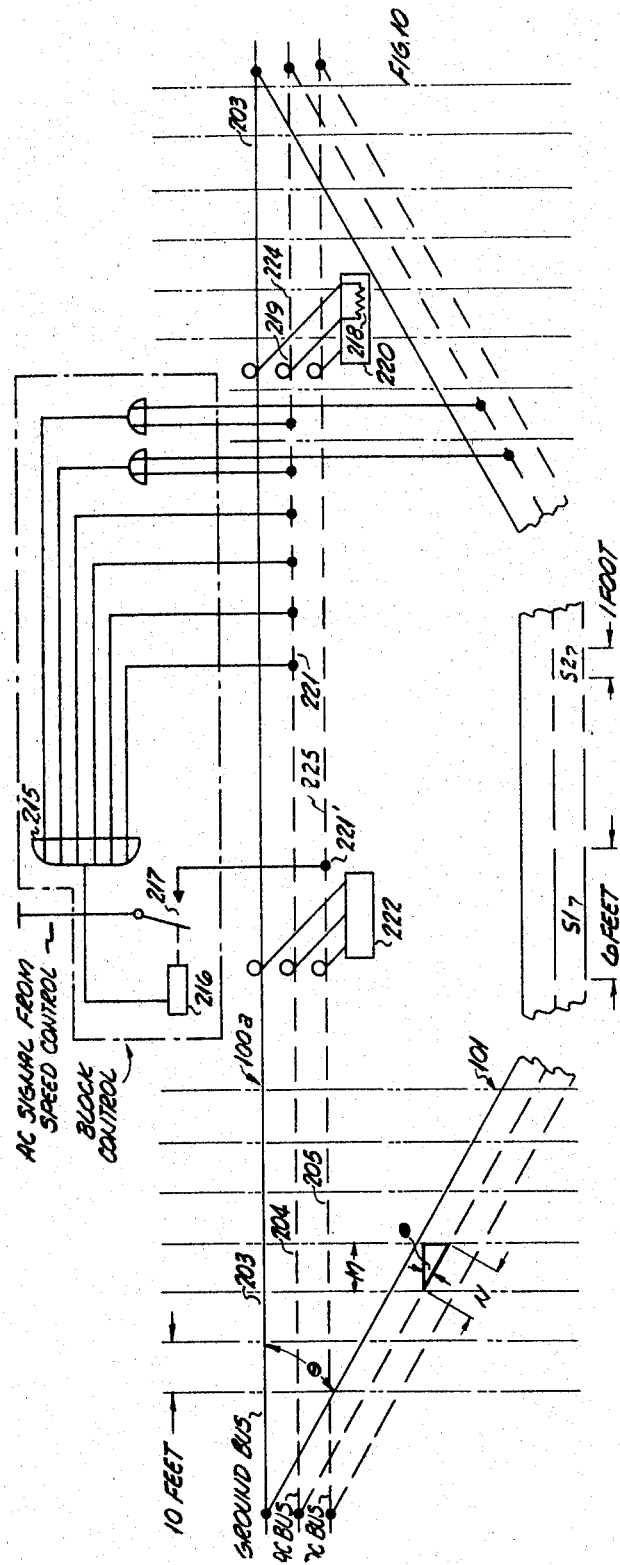
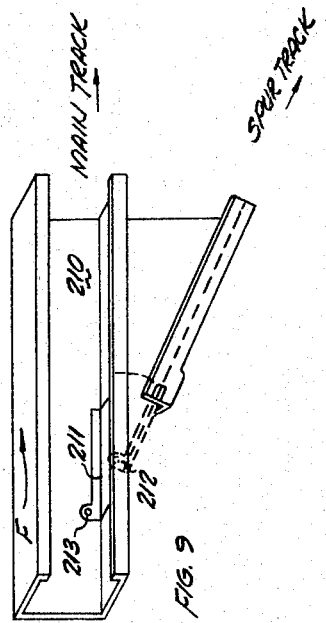
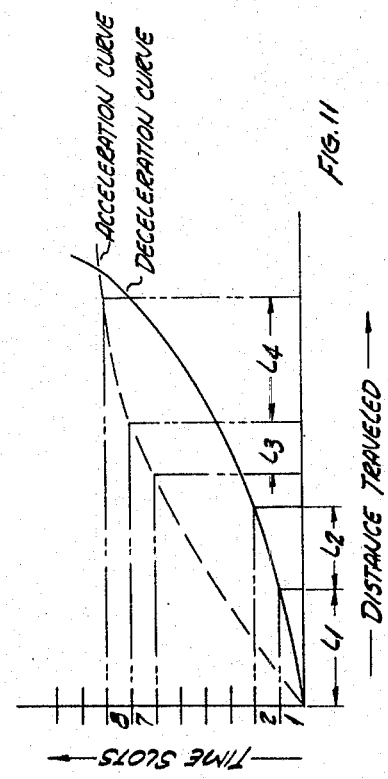

DOOR CONTROL

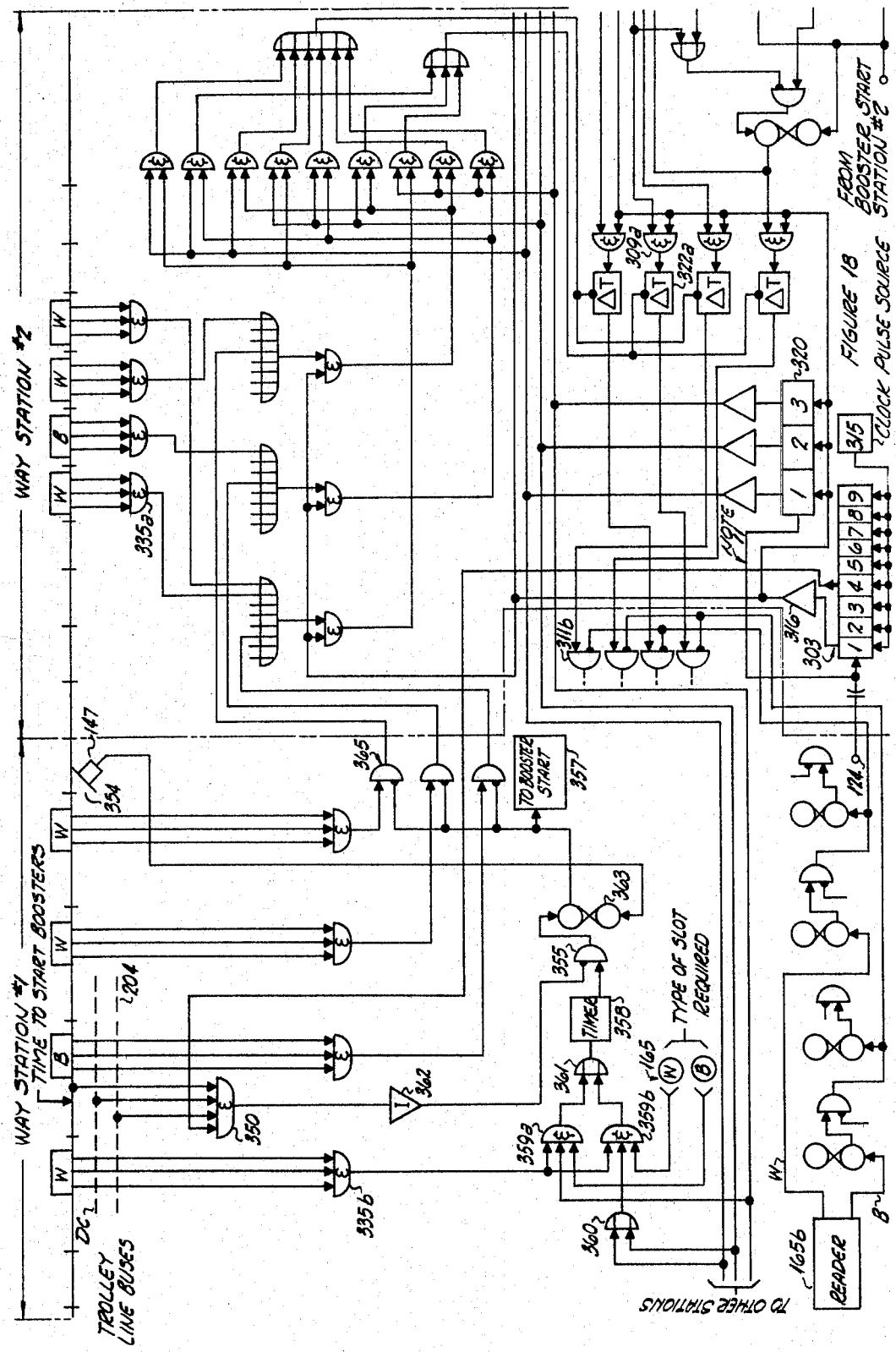

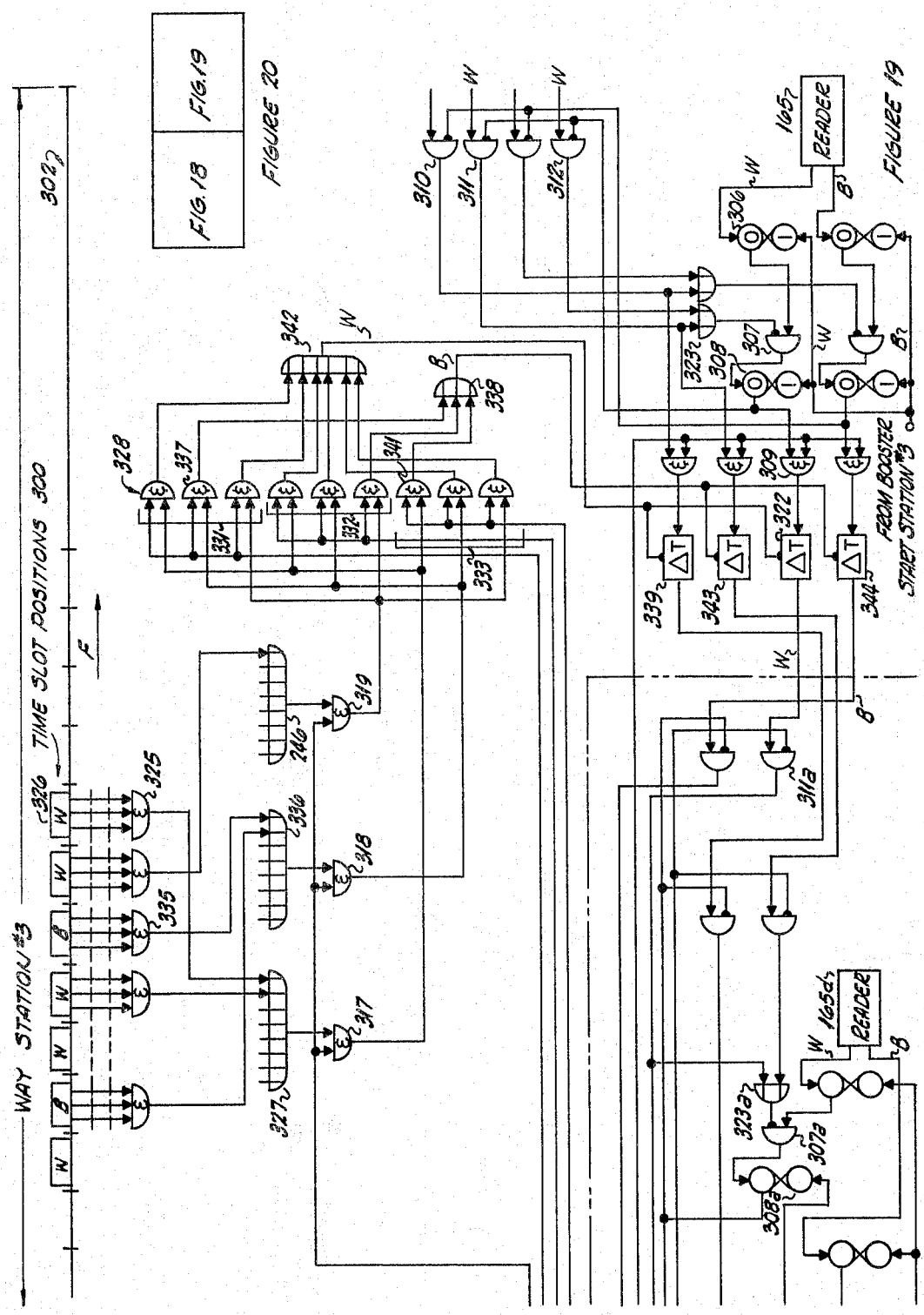

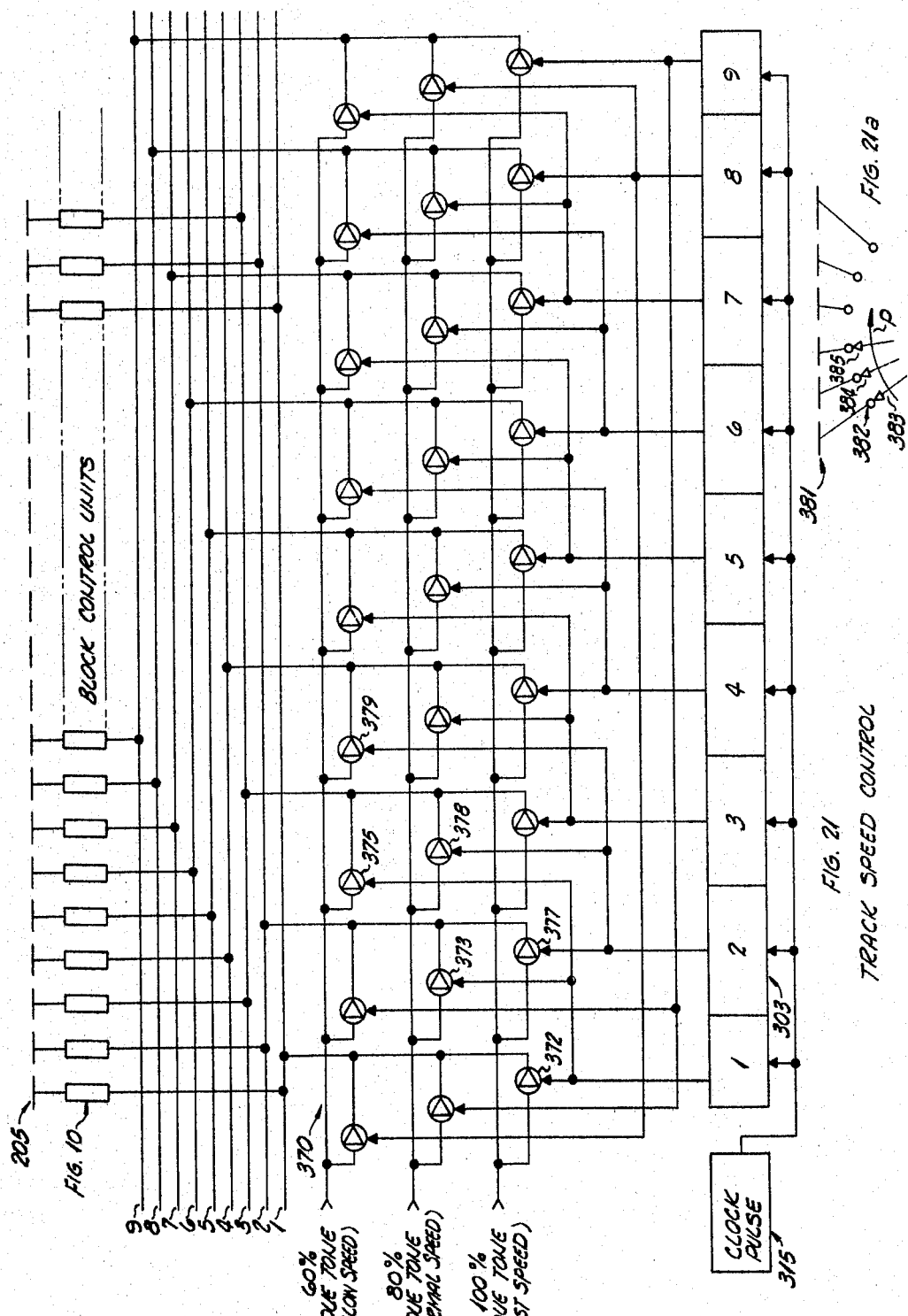

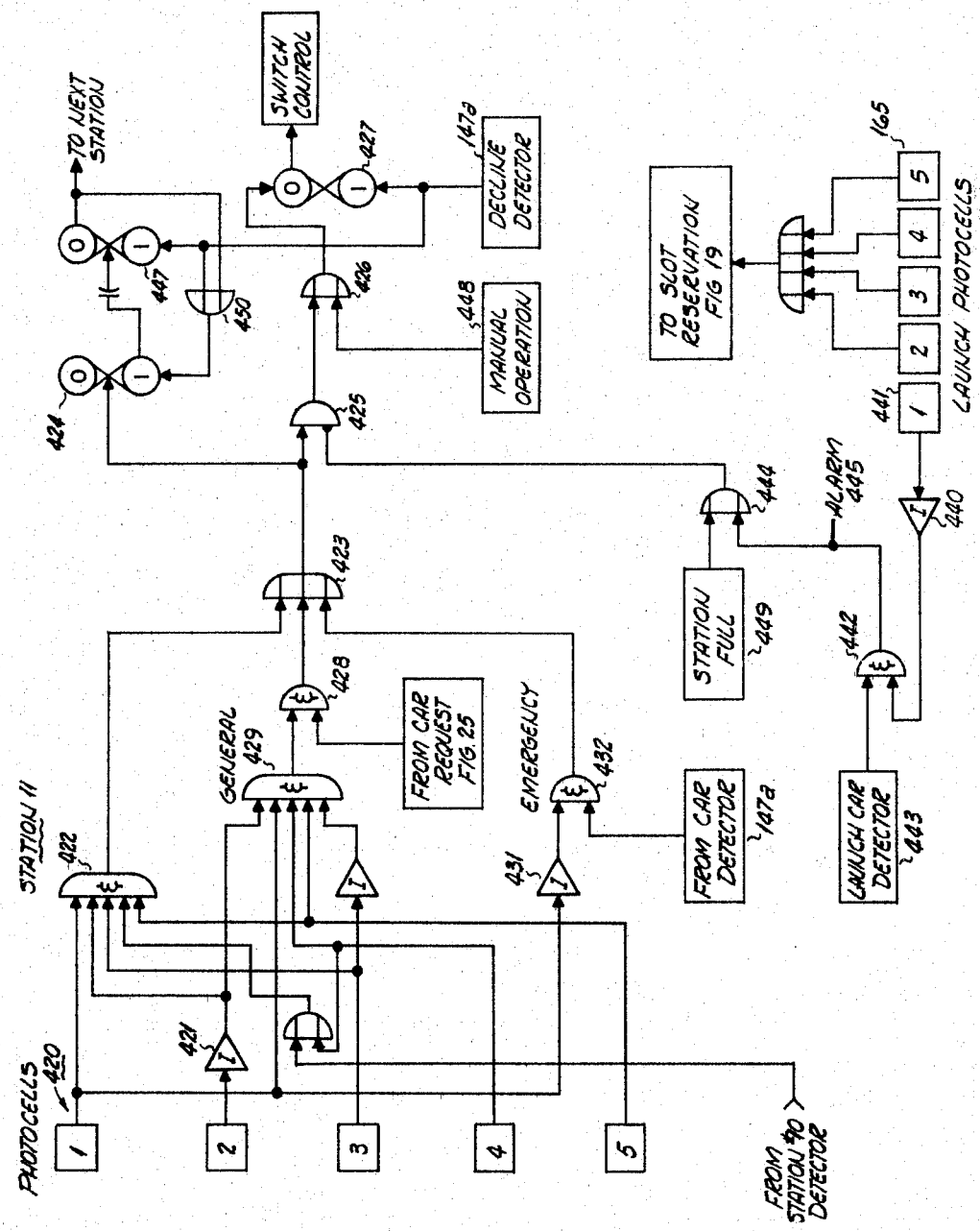

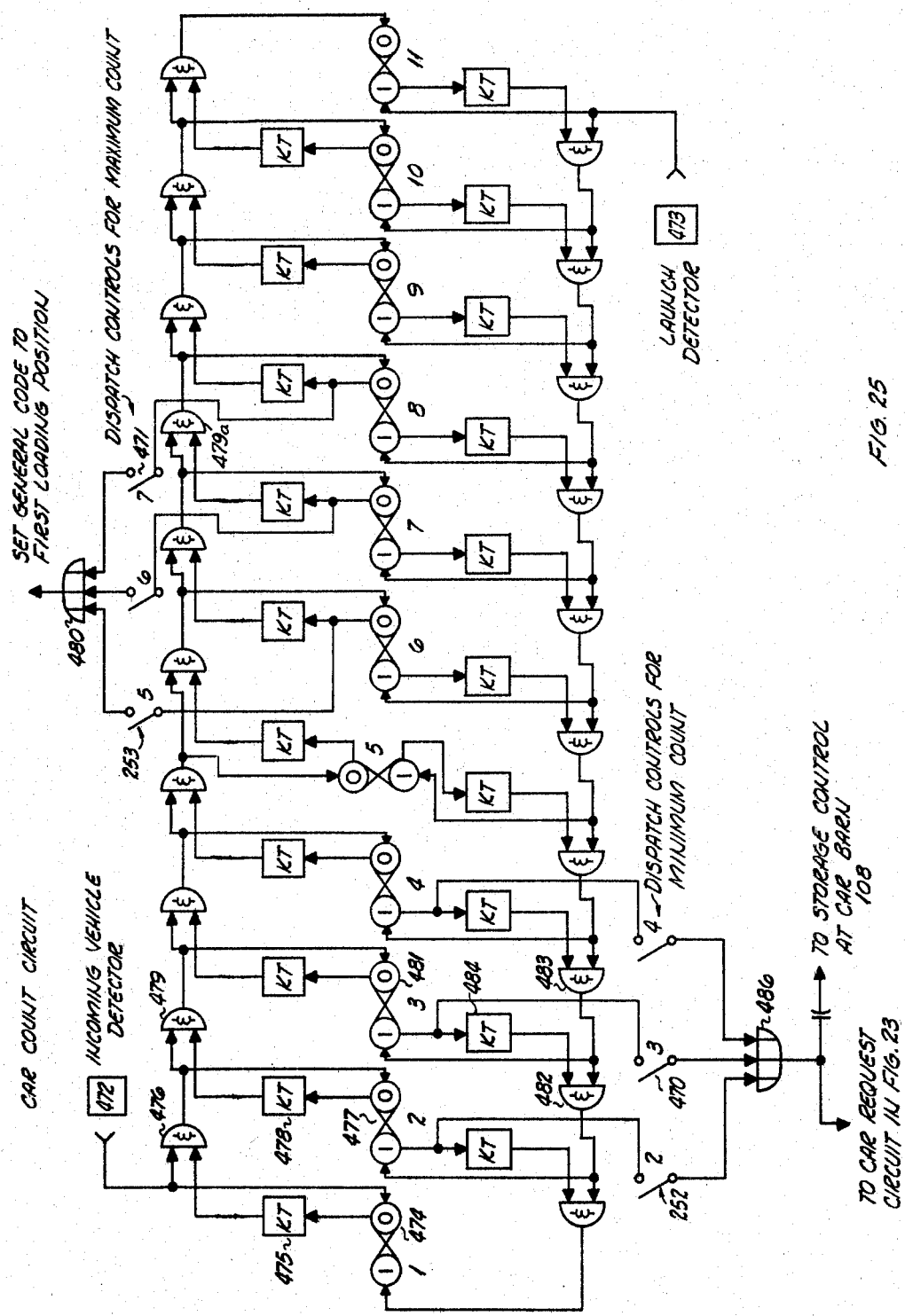

United States Patent Office 3,263,625
Patented August 2, 1966

3,263,625
ELECTRICAL CONTROL SYSTEMS FOR
POINT-TO-POINT TRANSIT SYSTEMS
Anthony M. Midis, Robert Czajkowski, and Donald C. Sheldon, Chicago, Ill., assignors to International Telephone and Telegraph Corporation, New York, N.Y., a corporation of Maryland
Filed Nov. 29, 1961, Ser. No. 155,642
52 Claims. (Cl. 104—88)

This invention relates to electrical control systems, and more particularly to electrical control systems for point-to-point transit systems.

Many transportation systems have been designed to eliminate its operators. Thus, persons using a system control vehicle in which they are then riding or which they are then using to transport goods and materials. For example, passengers control pushbuttons in self-service elevators to select floors at which the elevators stop.

Several modes of transportation which have not been adapted heretofore to self-service operation are those for transporting passengers between distant points. A first of these modes which includes vehicles that seat a great number of persons and make a prescribed number of stops on schedule—busses, for example—is herein called a "mass-transit" system. Another of these modes which includes vehicles that stop only at the origin and destination of a particular trip—taxicabs, for example—is herein called a "point-to-point transit" system. Of these two modes, obviously the point-to-point transit system provides a faster and more desirable service between any two selected distant points. Therefore, from the passenger's viewpoint, it is far superior to the mass-transit system. Moreover, from an operating company's viewpoint, the point-to-point trip is efficient because it does not require empty or mostly empty vehicles to operate needlessly.

Previous attempts to develop self-service, passenger-controlled, point-to-point transit systems have failed, primarily because the proposed systems were too expensive to build and too complex to operate. Usually, after such failures, the point-to-point concept has been abandoned in favor of the mass-transit concept. However, the self-service, mass-transit systems were inferior to the familiar busses, street cars, and subways, primarily because the safety features required to protect large masses of people were difficult to design and use. Moreover, these safety devices tend to slow the mass-transit vehicles so that the time required for a complete trip becomes excessive and passengers refrained from using the system.

Accordingly, an object of this invention is to provide new and improved electrical control systems and more particularly to provide electrical control systems for point-to-point transit systems. Another object is to provide an electrical control system that gives passengers control over the destination of self-powered vehicles in which they are then riding. More particularly, an object is to provide each vehicle with a passenger-controlled display identifying a point of destination for automatically switching each vehicle onto and off a main line track in accordance with such identification.

Another object of this invention is to provide a transit system controlled by running time slot pulses which sweep over the system tracks at a predetermined rate of speed. Since self-powered vehicles are locked into the time slots, the vehicles run over the tracks at the same speed. Thus, an object of this invention is to reserve time slot pulses according to positions of the vehicles on the tracks to facilitate switching the system tracks without danger of collisions at switching points.

Yet another object of this invention is to provide point-to-point transit systems having all safety controls required for safe and efficient transportation. Here an object is to provide self-powered vehicles with means for preventing collisions—especially rear end collisions—between the vehicles. In this connection, an object is to provide for overriding the safety control to allow remote manual control over vehicular motion.

In accordance with one aspect of this invention, a point-to-point transit system includes a closed loop main track on which self-powered vehicles run at a predetermined speed. A plurality of parallel spur tracks are switch-connected to this main track at each of a number of way stations. To operate a vehicle, it is only necessary for a passenger to push a button or operate a control device located inside a vehicle to indicate a desired point of destination whereupon a bank of external devices on the vehicle displays an identification of the point of destination. Upon such display, the self-powered vehicle is automatically launched onto the main line track at the predetermined system speed. As the vehicle travels about the track, data readers, positioned adjacent each way station in the transit system, read the bank of display devices and operate a switch to divert the vehicle from the main line track to a desired spur track, assuming, of course, that the display identifies such spur track.

In accordance with another aspect of this invention, the main line track is divided into a series of electrically moving control areas identified by time slot pulses. The term "control area" means a physical track section, the term "time slot" means a temporal control; hence, the electrical signals sweep over the track sections as a function of time.

To form the moving control areas, the time slot pulses control a successive application of vehicle command signals along individual segments of the track. In one exemplary system, these signals are applied to vehicles via segmented trolley line control busses that are parallel to the track. In this manner, the time slot controlled command signals sweep over the track at a predetermined speed. Each vehicle has a trolley riding on the segmented busses to detect the command signals. Thus, each vehicle is locked into position in a particular section of each time slot so that the vehicle travels over the track at the speed at which the time slot controlled signals are applied to successive bus segments, i.e. the speed at which the time slots sweep over the track. In this manner, each vehicle is separated from every other vehicle by a distance fixed jointly by the length of the control bus segments, the number of bus segments, and the time slot pulses.

The above mentioned and other features and objects of this invention and the manner of obtaining them will become more apparent and the invention itself will be best understood by reference to the following description of an embodiment of this invention taken in conjunction with the accompanying drawings, in which:

FIG. 1 shows, in a perspective aerial view, an area herein described as an airport having distributed facilities in which the point-to-point transit system operates;

FIG. 2 shows a close-up view of a way station in the system of FIG. 1;

FIG. 2a shows an alternative position for a bank of indicators on a vehicle exterior;

FIG. 3 and FIG. 4 shows two species of the electrical circuit included within a vehicle to provide the bank of indicators on the outside of a vehicle together with a wayside reader or detector;

FIG. 5 is a schematic diagram showing the manner in which time slots are distributed to provide electrically moving control areas for controlling the position of vehicles in the transit system;

FIG. 5a shows graphically the paths followed by black and white vehicles traveling over the system track;

FIG. 6 is a graphical portrayal showing, at a given time, the relative position of slots and segments thereof to indicate the manner in which time slots are utilized to control the speed or braking of vehicles in the system;

FIG. 7a shows an alternative embodiment using two trolley line buses;

FIG. 7b shows a second alternative embodiment using one trolley line bus;

FIG. 8 shows a series-parallel track section at a single way station to indicate the manner in which time slots are utilized to control the position of the vehicles boh on the main line track and as they are switched onto and off the parallel spur line;

FIG. 9 is a perspective view showing a vertical switch for diverting vehicles from the main line track to a parallel spur track;

FIG. 10 shows how the trolley buses are segmented to control the speed of the vehicles on the parallel tracks at a way station and also how block control prevents rear end collisions;

FIG. 11 shows a graphical method used to determine how long the trolley bus segments should be;

Figure 15:
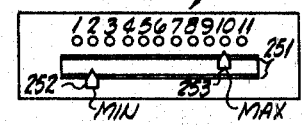
FIG. 15 is an enlarged view of a control device included on the control panel of FIG. 12 for selecting the number of vehicles which may be shunted onto any spur line at any given time.
Figure 22:
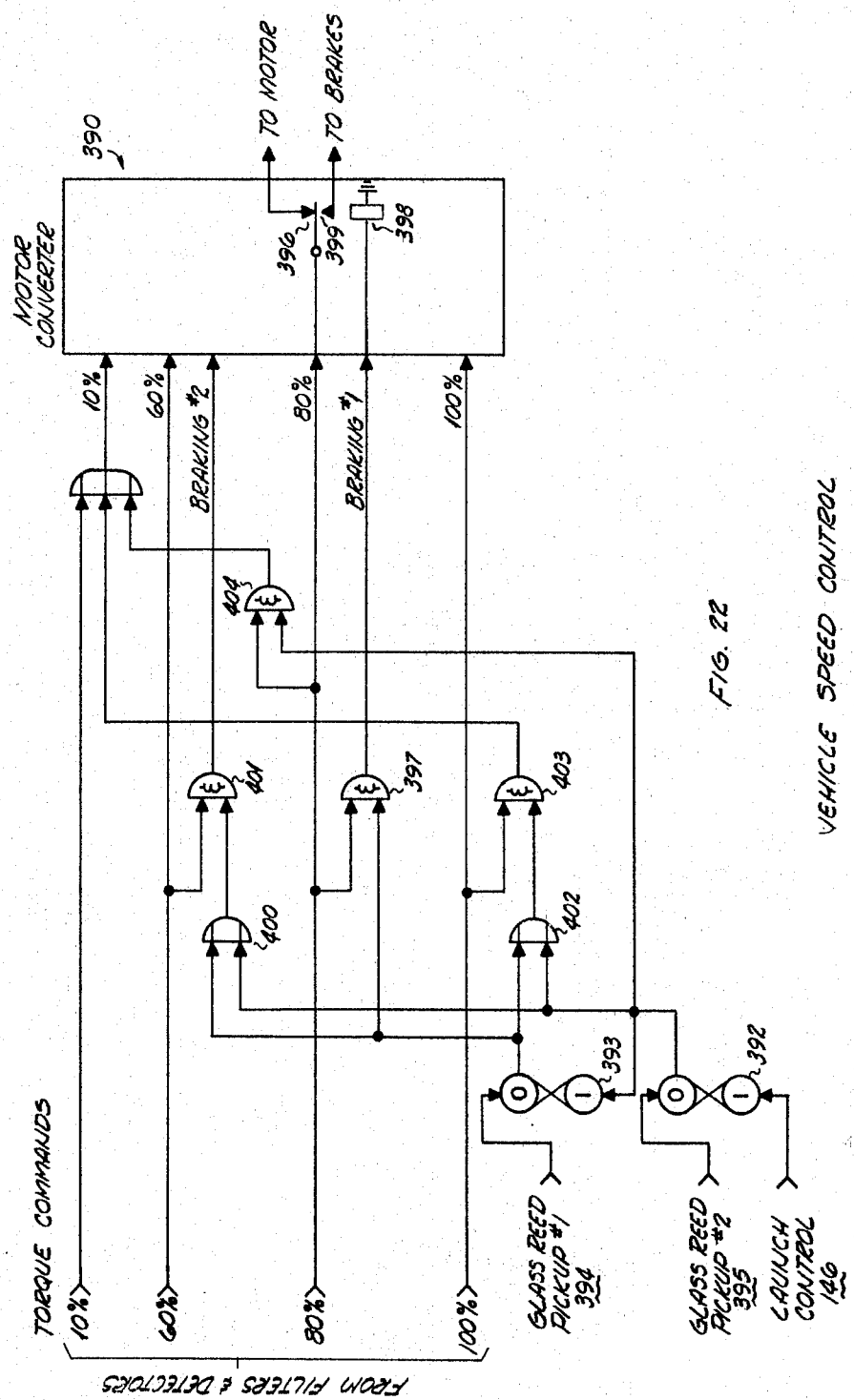

FIG. 18 and FIG. 19 (when joined as shown in FIG. 20) form a logic circuit drawing showing how time slots are reserved to enable vehicles at way stations to enter a main line track;

FIG. 21 shows a track speed control circuit by logic diagram;

FIG. 21a shows an alternative electromechanical means for applying track speed control signals to the trolley bus segments;

FIG. 22 is a logic diagram showing a vehicle speed control circuit;

FIG. 23 is a logic diagram showing a circuit for operating the switch of FIG. 9;

FIG. 24 is a table showing how the bank of indicators of FIGS. 3, 4 control the circuitry of FIG. 23; and FIG. 25 is a logic circuit diagram showing a car count circuit controlled by the panel of FIG. 15.

Throughout the following specification, simple terms and specific items are used and described. However, this should not be interpreted as any restriction upon the range of equivalents normally given under established principles of patent law. For example, in one of its broader aspects, this invention is for an electrical control system for controlling the movement of objects over a fixed path. The objects are described herein as vehicles and the path as an elevated track. Actually, the vehicles could be autos, street cars, subway trains, buckets, or the like. The fixed paths could be conductors embedded in highways, surface tracks, pneumatic tubes, conveyor belts, or the like. Moreover, the principal electrical control is described by time slot concepts; however, it could just as well be described by other terms, such as electrical time control periods. In fact, one suggestion has been made that the time slots be called "electrical buckets." Quite obviously, other examples could be selected to demonstrate the range of equivalents which should be given to this invention.

GENERAL DESCRIPTION OF TRANSIT SYSTEM

As shown in FIG. 1, a point-to-point transit system includes a closed loop main line track 100 and a number of spur line tracks 101–104 which extend into a number of way stations. The main line track 100 is here shown as elevated and the switching onto and off the spur line tracks is via vertical switching devices, shown at 105. This track system is described as a "series-parallel" system because all vehicles on the main line track travel in series on a one-way or single direction track, as indicated by the arrow A, while main line and spur line vehicles travel in parallel, as indicated by the arrows B, C.

Primarily this point-to-point transit system interconnects a number of distributed facilities within a given transportation area. In this exemplary system, the transportation area is an airport and the facilities are terminals 106, 107, a vehicle storage or car barn 108, a hanger 109, a parking lot 110, and a service area 111. More specifically, the main line track includes two closed loops 100a, 100b, it being understood that the main line track at point 112 connects via areas (not shown) to the main line track at point 113. For convenience of expression, the principally used main line track 100a is hereinafter called a "white" loop and the less used main line track 100b is called a "black" loop.

A passenger at terminal 106 wishing to go to the parking lot 110, for example, enters a vehicle 115 and pushes a button designated "Parking Lot." The vehicle 115 is then launched onto the main line loop 100a and travels around the white main line loop passing from point 112 to point 113 where a vertical switch operates at point 116 to divert the vehicle from the white loop onto the black loop track 100b. Thereafter, the vehicle continues around the black loop to the spur line 104. At that spur, the vehicle is diverted off the main line and stopped at a position shown by the vehicle 117. There the passenger disembarks for the parking lot. As soon as the vehicle is emptied at position 117, it move automatically to the most forward loading area and thereafter is available for the next passenger who enters and presses a button causing it to return to the main line black loop track 100b. The vehicle travels to the vertical switch point 118 where it is diverted onto the white loop track 100a, assuming that the point of destination is on the white loop track. Thereafter, the vehicle comes to rest at a selected location, such as that shown by the vehicle 119 at terminal 106.

The number of vehicles on any spur line at any given time is selected from a central location. Thus, in FIG. 1, three vehicles are shown at the terminal 106. Therefore, after the vehicle 115 is launched onto the main loop track 100a, an empty vehicle is diverted from the main line track 100a onto the spur line 101 so that three empty vehicles are again waiting for the next passenger. Actually, the number of empty vehicles at any given station may vary between selected limits, and usually traffic is balanced so that empty vehicular traffic is held to a minimum; however, additional vehicles are drawn from or put into storage at the car barn or vehicle storage terminal 108, as required by traffic fluctuations.

VEHICLE

The exact nature of the vehicle itself may be understood best by reference to FIG. 2 which shows a portion of a spur line track 101 and the main loop track 100a. The principal items shown in FIG. 2 are two self-powered vehicles 130, 131, a loading and unloading platform 132, and an airport control tower 133—the central location from which all vehicular motion is ultimately controlled.

The vehicle itself includes a gondola 140 suspended from an overhead dolly 141 at a pair of pivot points 142, 143. Thus, the passengers always ride in a horizontal-car position regardless of the angle of inclination of the dolly as it moves up and down the inclined tracks. The dolly 141 has at least four wheels (which cannot be seen in FIG. 2) adapted to ride in channels on the overhead track. The dolly also includes an electric motor 144 (and associated motor controls) driven at one of a number of fixed speeds or torque levels as commanded by signals applied to the vehicle from central controls at the tower 133. Thus, if the speed of the electric motor is increased, the speed of the vehicle is increased; conversely, if the speed of the electric motor is decreased, the speed of the vehicle is decreased. In a like manner, command signals transmitted from the tower 133 apply brakes in any well-known manner, as required.

Means are provided for detecting the position of vehicles on the system tracks so that control functions may be varied according to system needs. To accomplish this end, various actuators and pickups are distributed on the track and vehicle at selected positions. For example, if a pickup including a set of glass reed contacts 145, is on the side of the dolly, an actuator in the form of a magnetic coil 146 is positioned on the track to create a magnetic field for closing the contacts while the vehicle is adjacent to the coil. In another case, the glass reed contact pickup 147 is on the track and the actuator 148 is placed on the vehicle. Any number of actuator-pickup combinations may be distributed over the vehicle and tracks in such a manner that they do not interfere with each other.

The passengers are instructed to enter the loading platform area 132 through a coin-controlled turnstile 155. Awaiting in the loading platform area are the two vehicles 130, 131. The passenger approaches the leading vehicle 131, presses a button 156 to open a door 157, and enters.

Once in the car, the passenger observes seats and an internal control panel, as generally shown in the broken-away portion of the vehicle 130. More particularly, the passenger finds, within the vehicle, a pair of seats 160, 161 with a baggage compartment (such as 162) beneath each seat. Adjacent the seats, in a convenient location, is the control panel 163 including a number of pushbuttons 164 individually marked by the names of the various way stations. The keys 164 are interlocking so that only one key can be pressed at any given time. For example, with the distributed facilities shown in FIG. 1, first and second pushbuttons may be designated by the names of the air lines doing business at terminals 106, 107, respectively; a third pushbutton may be designated "hanger," a fourth pushbutton may be designated "service area," a fifth pushbutton may be designated "parking lot," etc. Obviously, additional pushbuttons may be provided to indicate any suitable number of way stations.

The first vehicle 131 is shown as advancing into a launch area where a wayside detector 165 detects the fact that this car is to be launched. To do this, the detector 165 reads a bank of indicators 166 whch displays on the side of the vehicle an indication of the point of destination keyed by the passenger on panel 163.

Two loading detectors 165' and 165" are at each platform. The first, 165', allows the vehicle to move forward into a launch position if: (a) vehicle doors are closed, (b) the indicator bank displays a passenger selected destination, and (c) the launch area is not occupied by another vehicle. The second, 165", commands a launch if: (a) all three above enumerated requirements are met, and (b) a slot reservation is made. The slot reservation is explained below.

In another embodiment, the bank of indicators 166' (FIG. 2a) is positioned on the top of the dolly 141' and the wayside reader 165' is suspended in juxtaposition with the indicator bank and above the track. In still other embodiments, the indicators could be placed elsewhere on the vehicle. The point is that the indicators and readers cooperate to identify the destination of the vehicle.

When a vacant moving electrical control area appears on the main loop track 100a (FIG. 2), a hook (not shown) on the dolly engages a booster having an endless running chain 167 somewhat reminiscent of the running chain that pulls a roller-coaster car up the first inclined track section of a roller-coaster ride. This endless chain, driven by a stationary motor 168, accelerates the vehicle 131 onto the main line track at the system speed (20 m.p.h. in one exemplary case). An advantage of this booster 167, 168 is that the motor 144 on the vehicle may be made smaller because peak power is required only during vehicle acceleration. Since the main line loop traffic moves at a fixed speed, the only large acceleration occurs during launch up the inclined track, i.e. in the booster zone.

Means, selectively operated from within the vehicles, are provided on each vehicle for giving an external indication of the point of destination of the vehicle. More particularly, this means is here shown as the bank of indicators 166 distributed along one side of the front of the vehicle. While many different devices may be used for the bank of indicators, they may be either electromagnets or lamps distributed along the side of the vehicle. For example, FIG. 3 shows a number of electromagnetic coils, here an arbitrary number of seven coils, individually connected to the pushbutton 164a. The electrical connections between the pushbutton contacts and the coils determine which of the coils is energized when a particular pushbutton is pushed. Thus, with the connections in FIG. 3, three contacts 170, 171, 172 close to energize the third, fourth, and seventh coils 173, 174, 175, respectively. A different pushbutton will, of course, energize other coils. In FIG. 4, the principle is exactly the same except that light bulbs are lighted, i.e. pushbutton 164b, lights bulbs 176, 177, 178.

Reading means are provided at each way station and diverging track switch to monitor the condition of the car, which condition is displayed on the bank of indicators along the side of each vehicle. These readers are physically located in the wayside detectors 165 distributed along the track (FIG. 1). Thus, each detector 165 includes a number of sensing units distributed in juxtaposition with selected ones of the indicator units in the display bank. For example, as shown in FIG. 3, the sensing unit 165a is a number of stationary, magnetically controlled glass reed contacts 180, 181, 182 positioned to operate and complete a series circuit "AND" gate when the coils 173, 174, 175 are energized. In the species of FIG. 4, the sensing unit 165b includes a number of stationary photoelectric cells 183, 184, 185 distributed in juxtaposition with selected ones of the lamps 166b on the vehicle. Thus, the three photoelectric cells are positioned adjacent to the lamps 176, 177, 178 to complete a series "AND" gate circuit. A wayside pickup 147a is included in the photoelectric cell circuit so that the sensing units readout only when a vehicle is present to avoid current from ambient light which normally strikes the cells.

Upon completion of the series "AND" circuit, a switch 186 or 187 operates to divert the vehicles from the main loop track to a predetermined spur line track. Assuming that the wayside detector 165a or 165b (FIG. 3 or 4) is located at 165c (FIG. 1), adjacent terminal 107, a switch 188 operates when the bank of indicators on the vehicle is energized as shown in FIGS. 3 or 4, so that the vehicle is diverted onto the spur line track 102. Obviously, the position 165c is exemplary only—it may be positioned at other locations also.

TIME SLOT CONTROL AREAS

In carrying out this invention, the track is divided into a series of electrically moving control areas by means of time slot pulses. For an understanding of these moving control areas, reference is made to FIGS. 5 and 6. FIG. 5 shows a white loop having four spur lines and a fragment of the black loop. FIG. 6 is a grahical showing of three time slots, each having nine segments numbered 1–9.

As shown by a solid line Arrow G (FIG. 5a), the white loop includes the rails of the most used track section. The black loop, shown by dashed line Arrow H includes both the white loop track and the extra track extending away from the white area. In this manner, all system time slots sweep over the tracks at the same fixed speed and there is no problem of meshing traffic on the two loops. Otherwise, the vehicles on the two loops would have to travel at different speeds to allow the time slots to mesh, thus producing a consequential jolting of passengers at the switching point.

The particular white loop of FIG. 5 is arbitrarily divided into seventeen control areas (one being shown at 190) and the fragment of the black loop is arbitrarily shown as having four control areas (one being shown at 191). Each electrically moving control area is indicated by a time slot divided into a number of segments, three of which (as shown at 192) control the speed of the vehicle and six of which (as shown at 193) control the braking of the vehicle.

The vehicle is normally locked into position in a segment of the time slot which controls the speed of the car and which forms an electrical control area signal, so that the vehicle travels at the speed at which the time slots sweep over the tracks. Assuming that the time slots rotate in the direction of the arrow F, the speed control segments 192 are arbitrarily shown at the leading edge of the time slots. Other notations could just as well place the speed control segments near the center or trailing edge—it is just a matter of definition. Specifically, at one instant, a command signal in the segment 1 nearest the leading edge of the time slot is a "slow" vehicle speed signal; a command signal in the immediately following segment 2, is a "normal" vehicle speed signal; and a command signal in the next immediately following segment 3, is a "fast" vehicle speed signal. Normally the vehicle rides in segment 2 where it receives a "normal" speed signal. If, for any reason, the vehicle begins to lag, it falls back into segment 3 where it receives a "fast" speed signal. Conversely, if the vehicle accelerates, it overtakes the segment 1 and receives a "slow" speed signal. Thus, since the time slots sweep over the track at 20 miles per hour in one system, the vehicles travel at an average of 20 miles per hour in that same system. In that particular system, the white loop carries a maximum of about eighty-five vehicles spaced at about ninety foot intervals on a 7500 foot track. The braking is ten feet per second, per second. The "fast" speed command signals are for 22 m.p.h.; the "normal" speed command signals are for 20 m.p.h.; and the "slow" speed command signals are for 18 m.p.h.

To brake the vehicles, command signals are applied in the segments 4–9 near the trailing edge of each time slot. Thus, if a vehicle accelerates beyond the "slow" speed zone (segment 1) or lags behind the "fast" speed zone 3, its brakes are applied. The brakes may be applied suddenly in the fourth segment 4, thus allowing an additional five segments for stopping. The brakes may also apply progressively increasing forces during each successive one of the time segments 4–9.

In some transit systems, the speed command signals may be spread over the time slot in a different manner. For example, if vehicles are particularly slow in pickup, the fast speed command signals may extend into the segment 4. On a particularly fast track where more space is required to stop a vehicle, two or more time slots may be combined to give additional space for applying brakes. In another system, the vehicle may travel at 20 m.p.h. on the white loop and at 40 m.p.h. on the black loop, i.e. several of the time slots may be combined to form larger time slots on the black loop than on the white loop to give a greater trailing distance for braking vehicular speed. Thus, an advantage of the segmented time slots is that the abruptness with which the various command signals take effect may be changed by the simple expedient of assigning or reassigning different command signals to different time slot segments.

Traffic surveys will indicate the percentage of vehicles which normally travel on the white and black loops. If one of every four vehicles in the system is destined for the black loop and the remainding three for the white loop, one time slot of every four is reserved for controlling vehicles on the black loop and the remaining three time slots are reserved for controlling vehicles on the white loop. This feature is shown in FIG. 5 where one black loop slot 190 leads three white loop slots 195. As shown at point 196, the black loop slots mesh at the intersection of the white and black loops. Thus, if a vehicle 115 (FIG. 1) at terminal 106 is destined for the hanger 109, the vehicle is launched into a black slot. When the vehicle 115 reaches switching point 116, its black time slot coincides with a black time slot on the black loop. Thus, the white loop vehicles mesh into the black loop traffic without danger of collision, and vice versa.

Traffic surveys will also determine how the white and black loop traffic may be switched between tracks in the most efficient manner. It may be efficient to route all black loop traffic around the white loop if it is short. On the other hand, if the white loop is long it may be efficient to divert strictly black loop traffic onto a siding 120 (FIG. 1). There black loop vehicles stop and await a vacant black loop time slot before being relaunched onto the main black loop track.

Assuming that the way stations are closely spaced on the white loop and widely scattered on the black loop, the invention contemplates a speeding-up of traffic after entry onto the black loop and slowing-down of traffic just before re-entry onto the white loop. The three white slots trailing each black slot facilitates this increased vehicular speed on the black loops by giving greater braking distance. Thus, if the white loop is at an airport and the tip of the black loop (FIG. 5a) is in the heart of town, vehicles may travel on the white loop indicated by the Arrow G at 20 m.p.h. At point 198, the vehicle may begin picking up speed at 60 m.p.h., for example, and at point 199, the vehicle may start slowing to 20 m.p.h. If necessary a booster (such as 167, 168) may be used to assist pickup at point 198.

VEHICLE SPEED AND POSITION CONTROL

Figure 7:
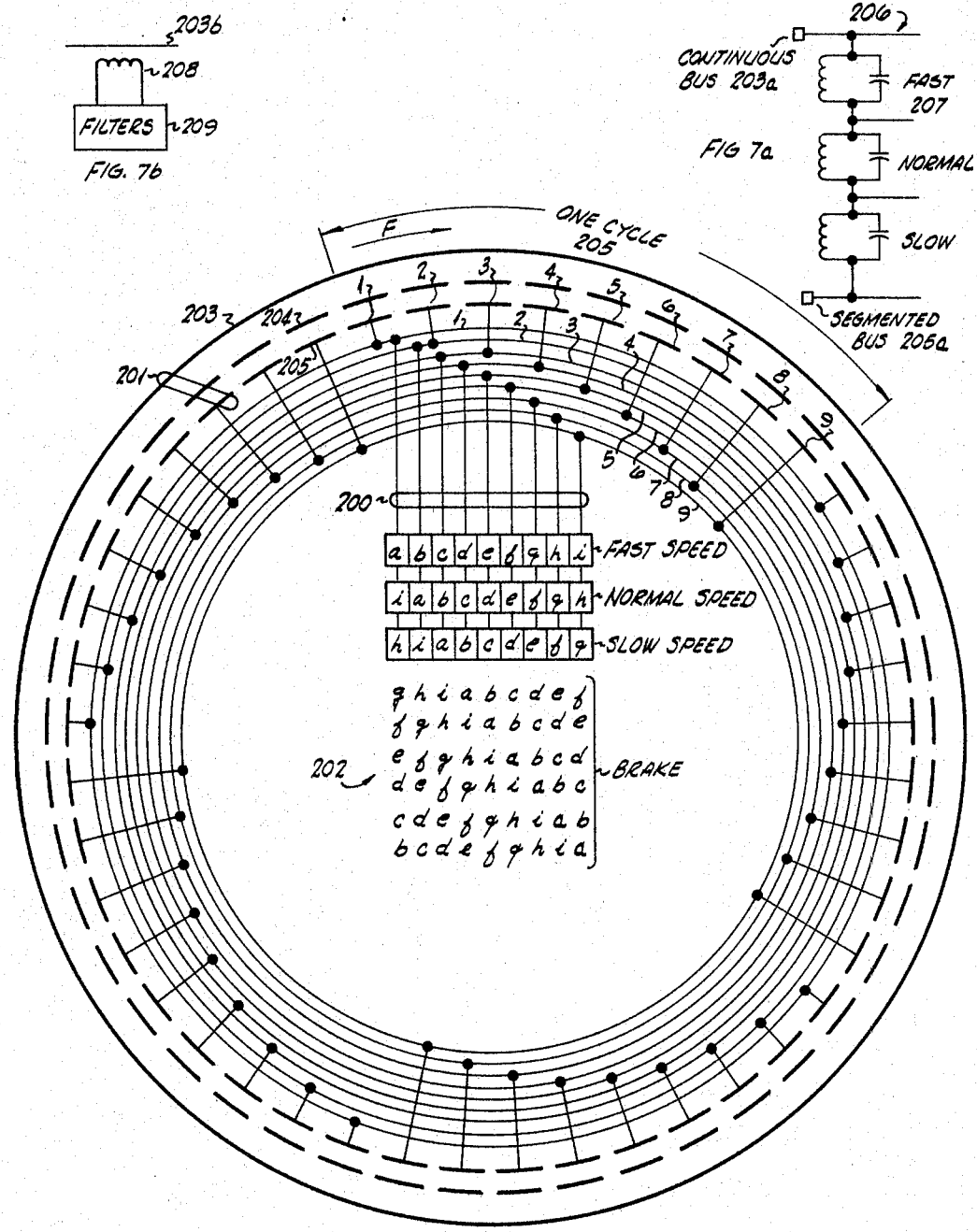
FIG. 7 is a graphical portrayal of how a three-wire trolley line running along the system rail is used to transmit control signals from a central computer to individual vehicles.

All of this speed control is accomplished via a three-wire trolley line which runs along the track as shown in FIG. 7. The view in FIG. 7 is that seen from the ground looking upward in FIG. 5.

The three trolley lines 201 include a continuous ground bus 203, a segmented D.C. bus 204, and a segmented A.C. bus 205. The ground bus 203 provides a reference potential, the D.C. bus 204 prevents rear end collisions, and the A.C. bus 205 controls vehicle speed and spacing. The trolley line 201 runs along the entire length of the track (both main and spur lines) for completing electrical connections between control equipment and vehicles. While the actual method of completing these connections is not important to the invention, a sliding shoe, a rolling wheel, an inductive coupling, a capacitive coupling, or a radio frequency pickup is contemplated.

The segmented of the A.C. bus are energized by the speed command signals under the control of a central computer 202. The computer is here shown symbolically by a series of segmented boxes which include the letters a–i. During the first time slot segment indicated by the letter a, a fast speed command signal is applied to a control conductor 1, a normal speed command signal to a control conductor 2, a slow speed command signal to a control conductor 3, and brake command signals to conductors 4–9. During the next time slot segment b, the fast speed command signal is applied to conductor 2, the normal speed command signal to conductor 3, the slow speed command signal to conductor 4, and brake command signals to conductors 5–9 and 1. An inspection of FIG. 7 indicates that the command signals step across the conductors 1–9 in numeral order. On the last time slot segment $i$, the fast speed command signal appears on conductor 9, the normal speed command signal on conductor 1, the slow speed command signal on conductor 2, and brake command signals to conductors 3–8. All of which brings up time slot segment $a$ and a repeat of the command signal cycle. This cyclic application of command signals repeats endlessly.

The segments of the A.C. trolley line bus 205 are cyclically wired to the conductors 1–9 to provide a continuous sweep of the command signals over the trolley bus segments. Specifically, one cycle 205 of the trolley bus segments is numbered to indicate how they connect to the control conductors 1–9. Four other unnumbered cycles are shown in FIG. 7; however, any number of A.C. bus cycles may be provided, depending upon the length of the track. In this manner, each A.C. segment is energized by a specific command signal during a corresponding time slot segment, and at the end of that time slot segment the specified command signal steps on to the next A.C. bus segment.

According to this feature of the invention, these bus and time slot segments are the means used to lock the vehicle into the time slot as it sweeps around the track. For example, on A.C. bus segment 5 during time slot segment $d$, the vehicle receives a normal speed command signal. If the vehicle reaches A.C. bus segment 6 during time slot segment $e$, it continues to receive a normal speed command signal and to travel at the fixed system speed. If the vehicle lags on A.C. bus segment 5 during time slot segment $e$, it receives a "fast" speed command signal which speeds it onto segment 6 where it belongs. On the other hand, if the vehicle overtakes A.C. bus segment 7 during time slot segment $e$, it receives a "slow" speed signal which slows it until A.C. bus segment 7 is energized by a normal speed command signal in time slot segment $f$. Hence, it is apparent that during each time slot segment, the vehicle must travel over a ten foot track segment (assuming each A.C. bus is ten feet long) if it is to receive normal speed signals.

From the above description of FIG. 7 it is apparent that the speed of the vehicle is controlled by the time required to travel over the adjoining length of the A.C. bus segment. Thus, if these bus segments are a uniform ten foot length, as assumed, the vehicle must travel at a uniform speed. If the A.C. bus segments become longer, the vehicle traveling at a uniform speed does not, in fact, leave the A.C. bus segment when the speed command signal changes. Therefore, the vehicle receives a fast speed command signal which speeds it onto the next A.C. bus segment. Conversely, if the A.C. bus segments become shorter and the vehicle maintains its uniform speed, it reaches the next segment too soon and receives a slow speed signal. Thus, it is obvious that the speed of the vehicle is changed on any given section of track by changing the length of the adjoining A.C. bus segment.

Therefore, if the trolley line bus segments along the white loop track G (FIG. 5a) are ten feet long to give a 20 m.p.h. speed, the trolley line bus segments on the black loop H between points 198, 199 will be thirty feet long to give a 60 m.p.h. speed. Stated another way, a vehicle on the black loop track must cover three times as much track as a vehicle on the white loop track during the same time period.

In another embodiment (FIG. 7a), two trolley line buses are used. One bus 203a is continuous and the other bus 205a is segmented. Speed control A.C. signals superimposed on a D.C. potential are applied to the segmented bus 205a. A series of parallel tuned filters 206 are connected across the buses 203a, 205a to separate the A.C. signals. In this manner, frequencies indicating a fast speed command appear at 207; normal and slow speed command signals appear across the other two filters. The D.C. finds a low resistance path from bus 205a through the coils of the filters to bus 203a.

In yet another embodiment (FIG. 7b), the trolley line bus is a segmented antenna 203b. The vehicle carries either an inductive pickup or a radio receiver 208, and filters 209 separate the command signals by frequency.

Means are provided at each spur line for adjusting the speed of vehicles at the switching point to prevent collision between the vehicles on the main line track and on the spur line track, to bring the vehicle to a stop on the spur line, and to return the vehicle to the main line at the fixed system speed. Before explaining the principles of this feature in detail, it may be well to note how the vehicles are switched from track to track in one exemplary system. First, the track switch (FIG. 9) is a vertical switch including a track 210 having a somewhat flattened "C" shaped cross-section channel in which the wheels of the dolly 141 (FIG. 2) ride. The switch plate or trap door 211 (FIG. 9) pivots at the end points 212, 213, and the vehicle travels in the direction of the arrow F. If the trap door is in a raised position, as shown by solid lines, the dolly wheels ride over the switch and the vehicle continues on the main line track 210. On the other hand, if the trap door 211 is swung at pivot points 212, 213 to the lower position shown by the dotted lines, the dolly wheels are diverted onto the spur line track. The return from the spur to the main line is via a similar switch.

An inspection of FIG. 8 shows that each vehicle on the main line track occupies a vertical space J and that each vehicle on the spur line track occupies a similar vertical space K. Thus, throughout a distance L (indicated by cross-hatching) there is an overlapping of the zones J, K and, hence, a danger that the bottom of a vehicle on the main line track may collide with the top of a vehicle on the spur line track if the latter vehicle happens to stop instantly.

Obviously, the vehicle must travel over the distance N on the spur line track 101 if it is to cover the distance M on the main line track that is necessary to prevent collisions in the cross-hatched zone L. Since N is the hypotenuse of a triangle having M as one side, it is apparent that a vehicle must travel over a greater distance on the spur line than on the main line during the same time period. Therefore, as a vehicle is switched from the main line track 100a onto the spur line track 101, it is necessary to accelerate that vehicle by an amount which brings the vehicle speed to that required to maintain a constant linear speed relative to the speed of vehicles moving along the main line track.

Once the vehicle on the spur track has cleared the cross-hatched collision zone, it is decelerated by incrementally decreasing the lengths of trolley bus segments to bring the vehicle to a smooth stop at the unloading and loading platform 132. The doors of the vehicle then open automatically, the passengers disembark in the "UNLOAD" zone, and the vehicle moves forward to a "LOAD" zone. The vehicle is there boarded by awaiting passengers after which it is launched onto the main line track again at system speed.

FIG. 10 shows the main line track 100a as divided into uniform length sections of track, each section being an exemplary ten feet long. The spur line is shown as leaving the main line at an acute angle $\theta$. Therefore, the A.C. bus segments located along this spur line track occupy the same linear distance as the hypotenuse N of a triangle having the angle $\theta$ at its apex and a ten foot length on its adjacent side M. Hence, it is apparent that, when the vehicle is diverted onto the spur line 101, its speed increases by an amount which maintains a constant horizontal velocity with respect to the main line track.

When the vehicle leaves the possible collision zone, the A.C. bus segments become progressively shorter and, therefore, the vehicle slows smoothly and evenly. For example, in a greatly enlarged portion of this particular figure, the track segments S1 are shown as six feet long at the start of the horizontal section of the spur line track. The length of the A.C. bus segments shorten progressively from this six feet to one foot segments S2 where the vehicle is moving at platform speed.

On the inclined portion of the track, the A.C. segments lengthen in a reverse order and speed builds in an apparent manner.

FIG. 11 shows a graphical method of analysis for selecting the lengths of the A.C. bus segments. First, by experimentation or otherwise, a desired acceleration and deceleration graph is plotted with "distance traveled" measured along a horizontal axis and "time slots" measured along a vertical axis. Then lines are drawn horizontally from each time slot indicating division on the vertical axis to the curve from which a line is dropped to the horizontal axis. The distances between the points where these dropped lines cross the horizontal axis indicate the length of corresponding A.C. bus segments and, therefore, the rate at which the vehicle is slowed. For example, from the deceleration curve (solid line curve), it is seen that the vehicle is allowed to travel over a much longer distance L1 when brakes are first applied and then over a much shorter distance L2. These distances become progressively shorter as the vehicle comes to a stop. Therefore, the vehicle is allowed to travel over progressively shorter distances during each successive time slot.

The acceleration during the launch onto the main line loop is accomplished in a similar manner. The dashed-line curve of FIG. 11 shows a predetermined acceleration pattern which has been found by experimentation or otherwise. Thus, by inspection of the graph, it is seen that the vehicle must travel progressively longer distances per time slot as the vehicle picks up speed. These distances are fixed by increasing the lengths of the A.C. bus segments. For example, during the seventh time slot, the vehicle travels the distance L3, and during the eighth time slot, the same vehicle travels a greater distance L4.

Block control means are provided on each of the vehicles for controlling signals applied to the three trolley line buses to prevent rear end collisions in case a vehicle stops instantly. As here shown, this means includes an "OR" gate 215 (FIG. 10), a relay 216, and an A.C. signal circuit opened or closed at contacts 217. This "OR" gate, relay, and A.C. circuit combination is repeated for every segment of the A.C. trolley bus, as indicated in FIG. 21. Each vehicle includes a resistor 218 for shorting the continuous ground trolley bus 203 to the segment of the D.C. bus 219 adjacent the track where the vehicle is located. Thus, the resistor 218 connects the ground bus 203 to the D.C. bus segment 219 for energizing the "OR" gate 215 and operating the relay 216. Since the "OR" gate has six input conductors connected to six successive D.C. trolley bus segments, the relay 216 also operates if the leading vehicle 220 is resting on any of the six segments between segments 219 and 221. The "OR" gate is also connected to spur line segments, as required.

In any event, if trailing vehicle 222 is six or less segments from leading vehicle 220, relay 216 opens a speed control circuit to the A.C. bus at contacts 217, thus removing the A.C. speed control signal from segment 221' which causes the trailing vehicle 222 to apply its brakes. As the leading vehicle 220 leaves the segment 219 and enters segment 224, a potential through a different "OR" gate removes the A.C. speed control signals from the next segment A.C. bus segment 225, and relay 216 restores to allow the A.C. speed control signal to reach the trailing vehicle. The trailing vehicle may either advance or remain stationary at this time, depending upon how the system operates. Thus, no trailing vehicle may approach the next leading vehicle by a distance closer than six trolley line segment (60 ft. in the cited example of ten foot bus segments).

MANUAL CONTROL

For manually controlling the position of system vehicles, a control panel (FIG. 12) is located at a central location, such as the control tower 133 of FIG. 2. This control panel 230 includes a layout (shown by a solid line in FIG. 12) of the system tracks 231 which exactly correspond to the layout of the physical tracks themselves. On the panel and adjacent each track position corresponding to a segment of the trolley line buses are a pair of lamps (as shown at 232), one of which indicates vehicular position and the other of which indicates where the time slots (speed commands) are at each given time. The car position lamp is lit from the D.C. bus 204 (FIG. 10) being occupied by a vehicle and the time slot position lamp is lit by the central control for generating the time slot pattern. By watching these lamps, a dispatcher may observe the orderly movement of vehicles on the system tracks. If a vehicle stalls or slows, the following vehicles have their A.C. speed command signal cut off by operation of the relays, as shown in FIG. 10. Immediately, the lamps begin to indicate that the vehicles are stalling at a specific location on the tracks, whereas the time slot position lamps continue to advance.

Figure 12:
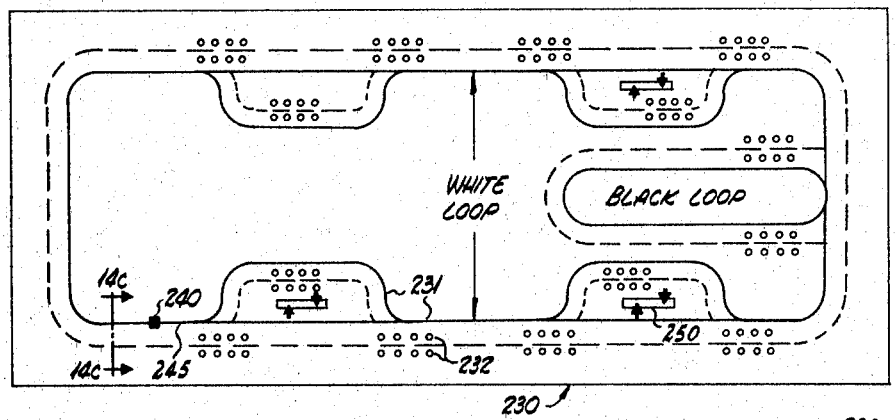
FIG. 12 is a plan view of a control panel for manually controlling the position of vehicles on the tracks.
Figure 14C:
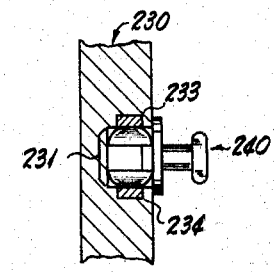
FIG. 14c is a fragmentary cross-sectional view taken along line 14c—14c of FIG. 12.
Figure 13:
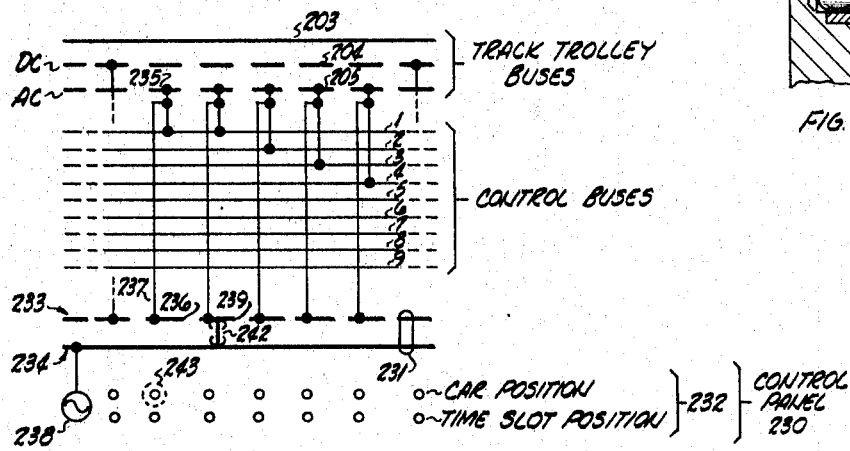
FIG. 13 is an electrical schematic circuit diagram showing how the vehicles are manually controlled from the panel of FIG. 12.
Figures 14A, 14B:
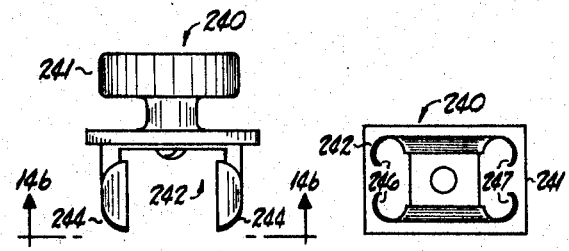
FIGS. 14a, 14b are front and bottom views, respectively, of a tool used in conjunction with the control panel of FIG. 13.

The details of the manual control panel and a hand tool used in conjunction with the panel are shown in FIGS. 12–15. Throughout the following position of the specification reference will be made to these figures interchangably. Therefore, the same reference numerals identify the same parts throughout all figures. More specifically, the tracks shown by solid lines in FIG. 12 are, in fact, grooves or channels formed in the control panel as shown in FIG. 14c. Within these grooves or channels are embedded conductors 233, 234 which have shapes and dimensions that form a miniature replica of the A.C. track trolley bus segment shown in FIG. 7. A hand tool (FIG. 14) fitting into the channel 231 provides means for manual controlling the vehicles. FIG. 13 shows a section of the track buses 203–205, and of the control buses 1–9 which are also shown in FIG. 7. For every A.C. track bus segment, there is a corresponding control panel segment as shown at 235, 236. Moreover, each A.C. track bus segment is individually connected to each control panel segment as at 237. Thus, any signal applied to the conductor segment 236 at the control panel also appears at the track trolley A.C. bus segment 235.

According to this feature of the invention, a signal generator 238 is connected to a continuous bus 234 running around the entire length of track channel 231 on the control panel. Thus, completion of a short circuit between the bus 234 and the segment 236, for example, applies an A.C. signal from generator 238 to the A.C. track bus segment 235 via conductor 237. This conductor 237 is not connected through the contact 217, FIG. 10; therefore, the rear-end collision avoidance circuit has no effect on signals applied from the generator 238 to track segment 235.

In carrying out this invention, a dispatcher at the control panel 230 uses a hand tool 240 to move system vehicles. More specifically, the hand tool includes an insulating handle 241 (FIG. 14) and an attached, formed sheet of electrically conductive material 242 (such as phosphor-bronze, for example) having rounded front, back, and bottom corners, thus giving a configuration somewhat similar to the hull of a ship.

If the dispatcher observing the lit condition of a lamp 243 wishes to control the vehicle on track segment 235, he pushes the hand tool 240 into the groove or channel 231 at a point adjacent lamp 243. The rounded bottom portion of the tool shown by heavily-linked lines 244, 244 (FIG. 14a) guides the tool into position in channel 231. When so positioned, the conductive material 242 completes a short circuit between bus 234 and segment 236 (FIG. 13) for applying an A.C. signal having the frequency of generator 238 to track segment 235 and, consequently, to the stalled vehicle represented by lamp 243.

This manual application of a command signal to the trolley line segment 235 drives the vehicle forward at a speed of two m.p.h. in one exemplary case. By observing the vehicle position on lamp bank, the dispatcher can watch the vehicle as it enters the track section controlled by the next A.C. bus segment 239. Thus, the hand tool 240 is slid along the groove 231 in a stepping motion segment-by-segment in accordance with lit lamps in bank 232 to drive the vehicle forward at two miles per hour. When a switch is reached, the stalled vehicle is removed from the main line track. The curved portions 246, 247 (shown by heavily inked lines in FIG. 14b) of the conductive spring material 242 guides the hand tool 240 as it is slid along the groove or channel 231. The hand tool 240 may also be long enough to introduce the A.C. of source 238 to two or three successive segments at a time, if desirable.

Completely stalled vehicles are pushed by the next trailing vehicle under the manual control of a dispatcher. Since the two m.p.h. manual advance signal is not applied through the contacts 217 (FIG. 10), the effect of the "OR" gate 215 which prevent rear end collisions is nullified. Thus, the trailing vehicle is eased up behind the stalled vehicle which is pushed at the speed of two m.p.h. as the hand tool is slid through the channel 245 on the control panel.

In any event, the stalled car is driven or pushed onto a spur line where its passengers disembark. They may thereafter take another vehicle to complete their trip. Meanwhile, the dispatcher requests service for the stalled vehicle. One solution is to have servicemen back a truck under the vehicle on the spur line, retract the dolly wheels, and carry the vehicle to a maintenance area, such as car barn 108 (FIG. 1).

After a stalled car is removed, the time slot generator is stopped momentarily. The vehicles advance to a "zero" position where each comes to rest on a segment which will receive a normal speed command when the time slot generator is turned on. The "zero" position may be selected by wayside detectors or from control panel.

Another feature of the invention gives the dispatcher at the control panel a selection of the maximum and minimum numbers of vehicles waiting on a spur line at any given station and at any given time. For example, assuming that the terminal 106 serves an airline extending to the East, passengers arrive and depart when it is convenient for eastern travel. Conversely, if the terminal 107 serves an airline extending to the West, passengers arrive and depart when it is convenient for western travel. Obviously, peak demands for vehicles at each terminal do not coincide. Thus, the vehicles may be deployed and redeployed in the most efficient manner so that a minimum number of vehicles can serve a maximum number of passengers.

To deploy vehicles, the control panel has a traffic control switch individually associated with each way station spur line. One such switch is shown at 250 (FIG. 12) and enlarged in FIG. 15. The switch includes a pair of pointers which a dispatcher slides along a pair of channels 251 to point at any one of a number of lamps. A first pointer 252 points at one light to fix a minimum number of vehicles, and a second pointer 253 points at another light to fix a maximum number of vehicles allowed on the indicated spur line at any given time. As best shown in FIG. 15, the minimum switch, on the left, and the maximum switch, on the right, are mechanically interferring so that the minimum number of vehicles cannot be advanced beyond the maximum number. Thus, a dispatcher with knowledge of the system requirements acquired by experience and schedules selects the number of vehicles on any spur line at any given time. In this manner, the vehicles are, from time to time, deployed in the most efficient manner so that passengers will almost always find a vacant vehicle awaiting them at the loading platforms.

DESCRIPTION OF ELECTRICAL COMPUTER

The foregoing description explains how the track system relates to an electrical control system. The following description explains a computer that provides this electrical control function. Throughout the drawings of these electrical control circuits, conventional logic symbols are used. However, since many conventions have been adopted, it may be well to explain these symbols at this point in the specification. For this, reference is made to FIG. 16.

An "OR" gate is disclosed by an elongated semi-circle including a number of input terminals which intersect the cord thereof. When any one or all of the input terminals are energized, a signal appears at the output terminal.

An "AND" gate is shown by an elongated semi-circle including an ampersand and having a number of input terminals, each marked by an arrowhead, touching the cord thereof. Only when all of the input terminals are energized simultaneously will a signal appear on the output terminal.

Figure 16:
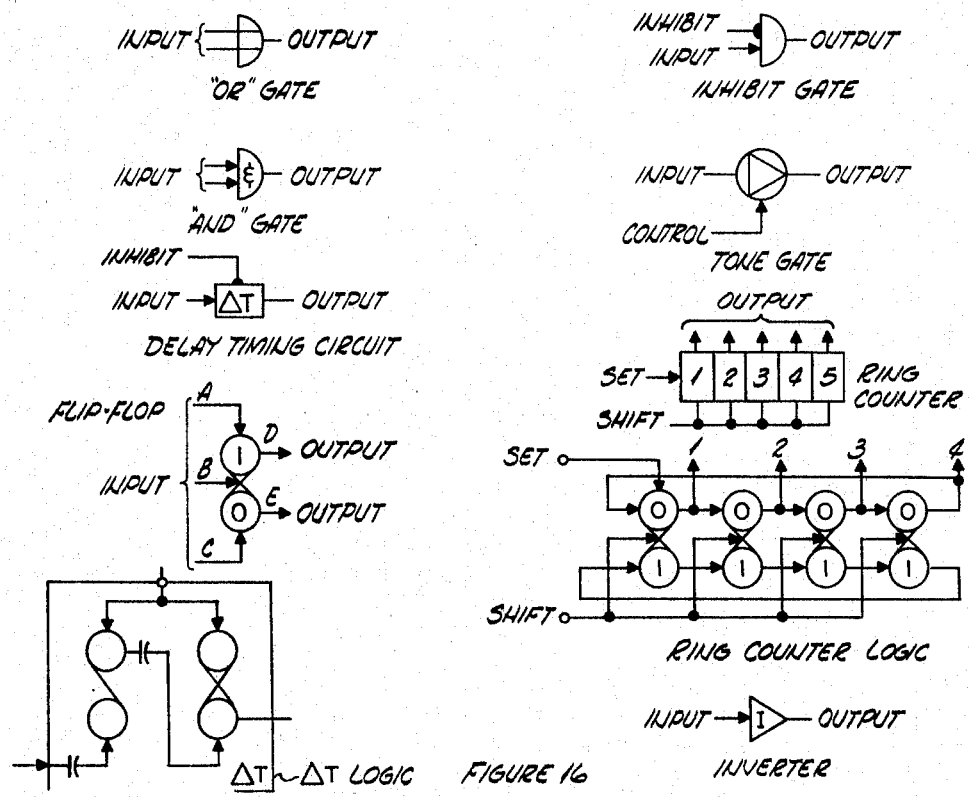
FIG. 16 is helpful in explaining the meanings of logic symbols used elsewhere in the drawings.

A delay circuit is shown by a rectangle including a "ΔT." A pulse input signal appearing at the input conductor (marked by an arrowhead) causes a delay for a predetermined period of time after the input pulse has ceased. Then a constant output is fed to the output conductor for a measured time period. If the inhibit conductor is then energized, the output is either canceled or prevented, depending upon whether the output has or has not started when the inhibit signal occurs. The logic circuit for a "ΔT" circuit is also shown in FIG. 16.

A flip-flop circuit is shown by a pair of displaced circles centrally joined by a crossmark. Three input conductors A, B, C control signals applied to two output conductors D, E. The circles are marked with a "1" and "0" respectively to indicate which of two stable states the flip-flop is in. If the signal "1" appears on input conductor A, the flip-flop applies a "1" signal to output conductor D and a "0" signal to output conductor E. If the signal "1" appears on input conductor C, the flip-flop is switched to give a "1" signal on output conductor E and a "0" signal at D. If the input conductor B, at the center of the crossmark, is energized, the output signals are switched from their existing states to the opposite state. Thus, if the flip-flop is standing with its "1" output on conductor D, an appearance of an input signal on conductor B causes a "1" output to appear on the E conductor.

An inhibit gate is shown by an elongated semi-circle having an input conductor marked by an arrowhead, an inhibit conductor marked by a heavily-inked dot, and an output conductor. Any signals appearing on the input conductor feed through the gate to the output conductor unless the inhibit conductor is energized, in which case no signals may reach the output conductor until the signal on the inhibit conductor is removed.

A tone gate is shown by a circle including a triangle. Any signals appearing on the input conductor feed through the tone gate to the output conductor if the control conductor is energized. Otherwise, there is no output.

A ring counter is shown by a segmented rectangle having arabic numerals in each segment to indicate output conditions. If the "set" terminal is pulsed, a signal appears at output "1." Thereafter each pulse on the shift terminal advances the output one step. Thus, with the circuit of FIG. 16, six shift pulses, for example, sequentially produce output signals on output conductors 1, 2, 3, 4, 5, 1. The cycle repeats as long as input pulses are received. All of this will be apparent to those skilled in the art from the ring counter logic shown in FIG. 16.

An inverter circuit is shown by a triangle including the letter "I." Output current normally flows over the "output" conductor, except when the input conductor is energized to terminate output current.

DOOR CONTROL

Figure 17:
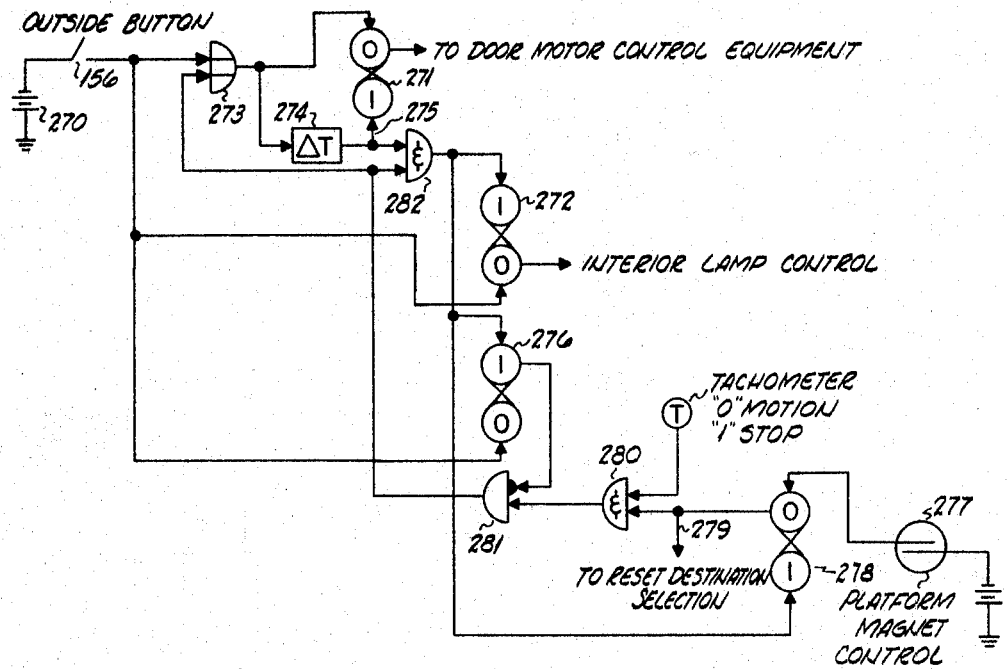
FIG. 17 shows, by logic circuitry, the controls for opening and closing vehicle doors.

Means are provided for automatically controlling the opening and closing of the vehicle door responsive to either the manual control button 156 (FIG. 2) at the time of passenger-boarding, or a platform controlled detector at the time of passenger-alighting. In either event, the control is accomplished through use of the circuitry of FIG. 17.

To provide a Fail Safe Feature, the "door motor control equipment" (not shown in FIG. 17) must operate as follows:

(a) "1" on the output of flip-flop 271 ("0" side) causes a door motor to operate and open the doors.

(b) "0" on the output of flip-flop 271 ("0" side) causes the door motor to keep the doors closed.

The "door motor control equipment" must inherently stop the motors from operating when the doors are open.

When the embarking passenger pushes the button 156 on the outside of the vehicle, a circuit is closed from a negative supply 270 (which may be a battery) to energize three memory or flip-flop circuits 271, 272 and 276. The objective is to prevent vehicular motion when the door is open. More specifically, the supply current flows through a first "OR" gate 273 to the flip-flop circuit 271 normally standing on its "1" side. The flip-flop 271 switches its "0" side to its "1" state, thereby transmitting a "Door Open" signal to the "door motor control equipment." The vehicle doors open. This same button-controlled current flows through the "OR" gate 273 to a ΔT 274 which causes a delayed signal after a predetermined period of time. This period of time is more than adequate to allow the passenger to enter the car.

When the ΔT circuit 274 applies its output signal to conductor 275, the flip-flop 271 resets to its original state, thus removing the signal to the "door motor control equipment." The doors close. However, as long as the door remains open, the motor is inhibited. As those familiar with the automatic door control are are aware, the door may be provided with automatic closing devices which cause the door to shut with an ever increasing force, thus giving passengers an opportunity to clear the entrance.

Also, closure of the outside door button 156 flips the second flip-flop 272 to the state opposite the state indicated in the drawing. Thus, the interior lights of the vehicle light. Finally, operation of the outside door button 156 feeds current to flip a third flip-flop 276 to the state opposite the state indicated in the drawing. This removes an inhibit from a platform control circuit in preparation for door opening at the end of a trip.

At the point of destination, the vehicle passes through the magnetic field of a wayside actuator (such as 146, FIG. 2) permanently associated with the platform. Responsive thereto, glass reed contacts 277 operate to complete a circuit for flipping a fourth flip-flop circuit 278 to the state opposite the state indicated in FIG. 17. Thus, a "1" signal appears on conductor 279 to reset the destination selection panel 163 (FIG. 2) and, hence, the bank of indicators 166 (FIG. 2). Also, (this "1" signal feeds into the lower input of an "AND" gate 280, the upper input of which is fed from a tachometer associated with the vehicle wheels. Thus, as long as the vehicle is moving, no signal "0" appears at the upper input of the "AND" gate 280 and the doors cannot open. However, immediately after the vehicle stops, the tachometer output "1" appears, there is a coincidence at the "AND" gate 280, and current flows through the inhibit gate 281 to the "OR" circuit 273. The "OR" gate output allows the doors to open by flipping flip-flop 271 to the state opposite state indicated in FIG. 17. After a time period sufficient for the passenger to exit, the ΔT circuit 274 conducts to reset flip-flop 271, allowing the doors to close. Also, the outputs of the inhibit circuit 281 and the ΔT circuit 274 coincide at the "AND" gate 282 which conducts and resets the flip-flop 272 to de-energize the illumination control and the interior lights extinguish. The output of this "AND" gate 282 also resets the flip-flop circuits 272, 276, and 278 to the state shown in FIG. 17.

The vehicle is now ready for the next passenger who pushes the button 156 to open the doors and cause the described cycle of operation.

SLOT RESERVATION

*General.*—Means are provided for reserving vacant time slots to launch a vehicle from a spur line onto a main line track without danger of collision. The object of the slot reservation circuit is, therefore, to find a vacant time slot at the command of a vehicle, and to launch the commanding vehicle into that vacant slot.

To facilitate an explanation of this feature of the invention, portions of the control circuitry associated with three exemplary way stations are shown in FIGS. 18, 19, when joined as shown in FIG. 20. The reason for showing three way stations is that, in this particular system, each vehicle awaiting its turn for launching onto the main line track is able to reserve time slots as far as three way stations, counting back over the main track from the way station where the launch is to take place.

The way stations are designated as #1, #2, #3 near the top of the drawings. Beneath this designation are small rectangles 300 which indicate the time slot positions at one instant of time that divide the track into electrically moving control areas. The letters "B" and "W" indicate black and white loop pulses respectively. The jurisdiction or area served by each way station is completely variable, fixed only by the length of track extending between the way stations. To emphasize this point, the way stations #1 and #3 are here shown as having jurisdiction over a section of track covered by twelve time slots, while the way station #2 is shown as having jurisdiction over a section of track covered by ten time slots.

The time slot movement for the entire system is controlled by the stepping of a master ring counter 303 (FIG. 18) which is the index for speed control circuitry. The master ring counter is, in turn, driven by a clock pulse source 315 and steps through nine successive steps corresponding to the nine segments of a single time slot. When the ring counter reaches its first or zero position, an arbitrary reference for scanning the time slots, the slots have definite physical locations along the track. As will become more apparent, the track is scanned for vacant time slots only when the master ring counter 303 is in its position "1." Therefore, a memory circuit is required to sustain any requests received during ring counter position "2–9" until a scanning can take place during the next succeeding position "1." This memory function is performed by a flip-flop 306 (FIG. 19).

If a pair of vehicles request a vacant slot of the same type (either both white or both black) from two adjacent way stations, preference is given on a "first come, first served basis" when ring counter 303 reaches position "1." If these two requests occur simultaneously, each way station scans only the track section adjacent it when position "1" is reached by counter 303. However, if a black slot request is received from a first station and a white slot request is received simultaneously from a second and adjacent station, there is no conflict and the slot request from the first station can extend back into the track section adjacent the second station without regard to the other simultaneous request. This is because white and black slot reservations are performed by separate logic circuits.

When a vehicle is loaded and a destination button 164 (FIG. 2) is pushed, the vehicle moves forward as other vehicles launch onto the main line track and spur track space becomes available. When the vehicle reaches the launch position, a wayside reader 165 (FIG. 19) gives a signal to the slot reservation circuit. This signal indicates whether a black or white time slot is requested.

If a vehicle in a white station is destined for either a white loop station or a black loop station, it requests a white slot or a black slot according to its needs. On the other hand, if the vehicle is at a black loop way station, it can only be launched into a black loop slot. Thus, it follows that the reservation circuitry in a black loop station may omit all white loop circuitry. Otherwise the logic circuitry at all way stations are the same.

The arrow "F" indicates the direction (toward the right as viewed in FIGS. 18, 19) that the time slots move. Therefore, the vehicle also moves toward the right. For this reason, the following description assumes that a vehicle at way station 3 (a white loop way station) has requested a white slot reservation and that reader 165 is energizing conductor "W." As reader 165 energizes conductor "W" flip-flop 306 switches from its normal state as shown in the drawing to its opposite stable state.

The "1" output of flip-flop 306 energizes the lower input lead of inhibit gate 307. Whether or not this signal gets through the inhibit gate depends upon whether a white time slot is then being reserved by a way station (not shown) but to the right of station #3. Such a reservation is designated by an output from "OR" gate 323.

Assuming that there is no conflicting reservation of a white slot from a preceding station, the inhibit terminal of gate 307 is not energized and the "1" output from switched flip-flop 306 switches a second flip-flop 308. A "1" signal appears at the upper input of an "AND" gate 309. In addition, the "1" output of switched flip-flop 308 energizes the control lead of inhibit gates 311 and 312, thus preventing the preceding two stations from reserving any white time slots on the track section marked "Way Station #3."

Meanwhile the ring counter 303 is stepping through its nine count positions. On its first position, the time chosen for scanning, ring counter 303 sends a signal through amplifier 316 to the left-hand input of "AND" gates 317–319, to a slave or sequencing ring counter 320, and to the lowermost input of "AND" gate 309.

*Preference.*—In carrying out this invention, preference is given on a "first come, first served basis." More particularly, there is a coincidence at the inputs of the "AND" gate 309 which starts a ΔT circuit 322 to measure a period of time adequate to complete a scan of the track adjacent way station #3. If no slot is found (designated by the absence of a reset signal to ΔT circuit 322), circuit 322 applies a signal which remains until a slot is available in way station #3's jurisdiction. This signal feeds through an inhibit gate 311a to cause a scan for a vacant time slot in the track section adjacent way station #2.

If no vehicle at way station #2 is attempting to make a white time slot reservation, no inhibiting signal is at the lower or inhibit terminal of gate 311a. Thus, the upper input of "AND" gate 309a is energized from inhibit gate 311a and the upper input of "OR" circuit 323a is also energized to inhibit the gate 307a (the same as gate 307 in station #3). This prevents any vehicle in station #2 from scanning for a white slot reservation. Note that station #2 may still scan for a black slot if reader 165d energizes conductor "B."

When master ring counter 303 reaches position "1" and an output from inhibit gate 311a is applied to "AND" gate 309a, an output starts the ΔT circuit 322a to measure a time period adequate to scan the time slots on the track adjacent way station #2. If no vacant slots are found (designated by an absence of a reset signal to ΔT circuit 322a), the ΔT circuit conducts to cause a scan of the time slots on the way station #1 track.

It should be noted that the ΔT circuits 322, 322a provide a time delay at each station to prevent a passing of the slot reservation signal back to the next preceding station until after a scan is completed at the station where the ΔT circuit is located. Thus, it is apparent that any vehicle in a launch position first scans the time slots allotted to the track adjacent the way station where launch will take place, then the time slots allotted to next preceding way station, and, finally the time slots allotted to the second preceding way station.

Means are provided for marking time slots as vacant or occupied according to signals appearing on the D.C. trolley bus segments. As has already been explained, each vehicle completes a shunt circuit from the ground bus 203 (FIG. 10) to the D.C. bus segment 219 adjacent that vehicle. Thus if a vehicle is in the electrical control area represented by time slot 326 (FIG. 19) for example one of three inputs to the "AND" gate 325 is grounded to prevent output therefrom. If none of the other time slots along the way station #3 tracks are vacant, nothing further happens until ΔT circuit 322 times out to pass the reservation signal to way station #2. On the other hand, if any time slot on station #3 track is vacant, an "AND" gate (such as 325) is energized at each of its three input terminals from the three associated trolley bus segments 204. Therefore, the output of "AND" gate 325 feeds through an "OR" gate 327 to another "AND" gate 317. A coincidence occurs at this "AND" gate when the master ring counter 303 reaches the start of a time slot.

*Black and white selection.*—Means are provided for selectively assigning black or white time slot pluses under the joint control of the master ring counter and the slave ring counter. Heretofore (FIG. 5) the black and white time solts were described as distributed in a 3-to-1 ratio (i.e three white slots for every one black slot). However, to emphasize that this distribution is purely arbitrary, the logic circuitry of FIGS. 18, 19 show a 2-to-1 ratio (i.e. two white slots for every one black slot). Therefore, the master ring counter 303 is arranged to drive the slave ring counter 320 through three steps. If, in fact, the distribution of black and white time slots is 3-to-1, it is only necessary to add a fourth stage to the slave ring counter 320 and a new group of "AND" gates in a series 328. By the same token, the slave ring counter 320 may be increased or decreased to provide any desired distribution of black and white slots. In any event, the slave ring counter 320 is driven one step at the start of each time slot (i.e. on position "1" of master ring counter 303) through a number of steps corresponding to a complete cycle of black and white time slot patterns. Thus, the slave ring counter selects black or white slots. That is, from the viewpoint of any track section, the black and white assignments change as the time slots sweep over the track. Thus, the trolley bus segments at 326 are white during time period represented by the position 300. After two time slots, these same trolley bus segments are black. The slave counter remembers these track conditions.

For this description, it is assumed that the slave ring counter stands on position "1" and that trolley bus segments at 326 are vacant; a coincidence occurs at "AND" gate 325; a signal feeds through "OR" gate 327 to "AND" gate 317. On position "1," master ring counter 302 energizes the other input of "AND" gate 317 which conducts to energize an input of one "AND" gate in each of the groups 331, 332, 333. With slave ring counter 320 on step "1" there is a coincidence at gate 328 which conducts. The output of gate 328 feeds through a white "OR" gate 342 to reset the white ΔT circuits 322, 339. This prevents an output from these ΔT circuits, and hence, the passing of a white time slot reservation request signal to "WAY STATION #2."

Next assume that track section 326 is vacant during a black time slot. Master ring counter 303 completes its cycle twice and pulses ring counter 320 via amplifier 316 at the start of each cycle. Ring Counter 320 steps to position "3." A signal from the trolley line feeds through "AND" gate 325, "OR" gate 327, "AND" gates 317, 341, and "OR" gate 338. This signal resets the black ΔT circuits 343, 344 to prevent passage of a black reservation request signal to "WAY STATION #2."

By tracing the input connections to all "AND" gates in series 328, similar control over ΔT circuits is found. Moreover, each of the "OR" gates 327, 336, 246 is multipled to the track buses in accordance with the black and white slot pattern, e.g. "OR" gate 336 connects to every trolley line bus segment along the "WAY Station # 3" track which is black during position "1" of slave ring counter 320. Other "OR" gates have similar connections. Therefore, if any black slot is vacant along the station #3 track at any time, the black reservation request circuit to station #2 is inhibited and if any white slot is vacant, the white reservation request circuit is inhibited.

*Launch.*—Means are provided for launching the vehicle into the first available, vacant time slot. The vehicle waiting at a way station does not care whether there are one or many vacant time slots of a desired color on the track. It is only important that an available vacant time slot of the desired color be assigned to control vehicular motion, and preferable that the first available of such slots be assigned.

The circuit for assigning vacant time slots at launch time is shown in association with way station #1 (FIG. 18), it being undestood that similar circuitry is provided at each station. In this circuit, a four input "AND" gate 350 controls the time of launch. A first input to this "AND" gate connects to an appropriate stage of the master ring counter 303 dictated by the parameters of the system. For example, the angle of incline of the track at station #1, the weight and acceleration capability of the vehicle, the capabilities of the booster, etc., fix the time slot segment when the vehicle must be launched to be sure that it reaches the switch when a speed control signal is on the adjacent A.C. bus segment. Arbitrarily the launch signal is here taken from the fourth segment of ring counter 303. In another way station, this launch signal could be taken from either this or any of the other time slot segments of ring counter 303. The remaining inputs of this four input "AND" gate 350 are energized from the D.C. busses 204 if a vehicle is not then shunting the ground and D.C. buses.

In any event, upon coincidence of a vacant time slot, a particular time slot segment, and the input from position 4 of the ring counter 303, an output from "AND" gate 350 removes an inhibit from gate 355, to start a booster operation at 357 and actually cause the vehicle to be launched. More particularly, a timer 358 is started by coincidence of the following three signals at "AND" gate 359b: a vacant time slot, a white slot pulse from slave ring counter 320, and a white reservation signal from a wayside detector 165. If a white pulse reservation is indicated by the detector, the lowermost of the "AND" gates 359b is energized when the slave ring counter 320 is on any except the last position. The output of these three input "AND" gates 359 is fed through an "OR" gate 361 to start the timer 358. Normally, the inhibit terminal of gate 355 is energized from inverter 362 so that output current from timer 358 does not reach flip-flop 363. However, when the time-to-start pulse appears at gate 350, inverter 362 switches off and the inhibit is removed at gate 355, thus switching the flip-flop 363 to the state opposite that shown to give a "1" output on the "0" side. Thus, a signal is sent through circuit 357 to start the booster motor and begin the launch of the vehicle. If, for any reason, the inhibit is removed from gate 355 too late to start the booster, timer 358 will have timed out to terminate its output current, and the vehicle must await the next vacant time slot.

The same "1" output from the "0" side from flip-flop 363 inhibits gates 365 and prevents the misinterpretation of a slot being filled as one that is available for the next track section (i.e. that of station #2). The reason for these three inhibit gates 365 is that a vehicle in way station #1 may be preparing to launch. However, by the time that the launched vehicle reaches the main line track at switch 354 and has locked into a time slot, that slot will have swept onto the track under the jurisdiction of way station #2. Therefore, a vehicle in way station #2 must not launch into that same apparently vacant time slot. It is to preclude this possibility that the last three slots (or more, depending upon the physical track layout) in the WAY STATION #1 zone are connected through inhibit gates 365 to the circuit in the WAY STATION #2 zone.

As the launch is completed, a magnetic field on the vehicle operates a wayside detector 147 (which may be a glass reed contact) to complete an electrical circuit for resetting the booster start flip-flop 363 to its normal state with output "0" on the "0" side. This ends the electrical logic functions associated with a launch.

SPEED CONTROL

After the vehicle is launched onto the main line track, its speed is controlled by a circuit, the logic of which is shown in FIG. 21—also see FIG. 7 for a graphical portrayal.

The principal portions of this circuit are the master ring counter 303 driven from a source of clock pulses 315 and having the nine step count cycle corresponding to the nine segments of a time slot, a plurality of A.C. signals of different frequency (herein called "TORQUE TONES"), and a number of tone gates 370. The torque tones command the vehicle motor to turn with a specified torque. If speed commands are used, a servo system may be included in the vehicle.

It is assumed that all vehicles on the loop are moving along with the slots assigned at launch and function normally.

During the first time slot segment and on the first position of the master ring counter 303, a circuit energized to tone gate 372 for applying the 100% torque tone (the fast speed signal) to the first A.C. bus "1" which is connected to every ninth A.C. trolley bus segment around the loop starting with # one. Each connection is via a block control circuit as shown in FIG. 10. Also on the first position tone gate 373 conducts for applying an 80% torque tone (the normal speed signal) to a second A.C. bus which is also connected to every ninth A.C. trolley bus segment around the loop starting with # two. Finally, tone gate 375 conducts for applying a 60% torque tone (the slow speed signal) to a third A.C. bus and every ninth trolley line bus. During the second time slot segment and on position "2" of ring counter 303, the 100% torque tone is applied through tone gate 377 to A.C. bus "2," the 80% torque tone is applied through tone gate 378 to the A.C. bus "3," and the 60% torque tone is applied through tone gate 379 to the A.C. bus "4."

Upon inspection of FIG. 21, it is seen that throughout the entire nine step count cycle of the ring counter 303, the three speed control command signals sweep across the entire track area, segment at a time. The vehicle will, accordingly, move at the same rate of speed as the A.C. signals sweep across the track. It should also be noted that after the A.C. signals sweep away from a bus segment, no electrical signals appear on that segment until completion of a cycle by the ring counter 303. This absence of such a signal is a brake command.

An electromechanical version of this same principal is shown in FIGURE 21a. Each A.C. trolley bus segment connects via a block control to these A.C. busses as shown in FIG. 21. The A.C. busses connect in order with a corresponding terminal in the bank 382 of the switch. Associated with the bank are three brushes 383, 384, and 385 carrying the fast, normal, and slow speed command signals respectively. Thus, as the brushes sweep over the terminals 382 in the direction of the arrow P, the speed command signals are applied to the A.C. busses. By providing a plurality of three brush groups separated by an angular distance equal to six bank terminals, the speed command signals reappear in the desired nine segment cycle, i.e. three speed command signals followed by six brake command signals.

The manner in which the vehicle responds to these torque and brake signals is explained by the logic circuity of FIG. 22. This circuit includes a motor converter 390 which makes use of the six commands available, to control the motor speed or braking effort.

Means are provided for interpreting the meaning of the torque command signals in accordance with the location of the vehicle on the track. For example, on the main line track, an 80% torque tone may command a vehicular speed of 20 m.p.h. However, on the declining section of the spur track, this same 80% torque tone may command a vehicular speed of 10 m.p.h. At the loading platform, the 80% torque tone may command a gentle braking of the vehicle. The 80% tone may have still other meaning elsewhere on the track. The means for accomplishing this interpretation of command signals includes a pair of flip-flops 392, 393 controlled from wayside track detectors 394, 395. It must be kept in mind that the motor converter responds to the lowest speed or the greatest braking effort command received.

The vehicular speed control circuit (FIG. 22) operates this way. The trolley picks up the signal on the A.C. bus; it is filtered in the vehicle. Then a signal is applied to the appropriate torque command conductor. Assuming that such a signal appears on the 80% torque conductor, the "motor converter" controls the power necessary for the motor to develop 80% torque.

After the vehicle starts down a track decline, a wayside actuator closes glass reed contacts 394 to switch the flip-flop 393 to give a "1" output from the "0" side. A signal is now fed to the lower input of an "AND" gate 397. If an 80% torque command signal is on the adjacent A.C. trolley bus segment, there is a coincidence at gate 397 with a resulting operation of the brake mechanism with a gentle braking. Also, this same "1" output from the "0" side of flip-flop 393 feeds through an "OR" gate 400 to the lower input of another "AND" gate 401. If the torque command signal thereafter changes from the 80% to the 60%, the brakes are applied violently.

Further down the track decline, a second "PICKUP #2" operates at 395, thus switching the second flip-flop 392 to get a "1" output from the "0" side and reset flip-flop 393 to its original state. Also, the "1" output signal from flip-flop 392 feeds through an "OR" gate 402 to a first "AND" gate 403 and directly to a second "AND" gate 404 to cause the vehicle to move at the platform or 10% speed if either the 100% or 80% torque command signals occur. Emergency braking results if the 60% torque command signal occurs because it coincides at "AND" gate 401 with the "1" output of flip-flop 392 applied through "OR" gate 400.

After the vehicle has stopped and then moved forward into the launch position, a wayside actuator closes glass reed contacts 145 (FIG. 2) to apply a resetting signal to the second flip-flop 392. The circuit returns to normal and responds to the torque command signals at the main line speed.

SWITCH CONTROL

The next described electrical control circuit (FIG. 23) operates the vertical switch (FIG. 9) that deflects the vehicle from the main line track to a spur track and back again. It will be recalled from FIG. 4 that seven indicators were described and shown in the bank 166b. However, that number was purely arbitrary; therefore, to emphasize this arbitrary feature, five photocell pickup devices 420 are shown in FIG. 23. In any event, these photoelectric pickup cells are selectively energized from the bank of indicators 166 in accordance with the passenger-controlled key operation.

General.—With the five photoelectric cells shown in FIG. 23, the system is adapted to serve up to thirteen way stations. By the symbology of the table of FIG. 24, it will be apparent to those skilled in the art how the push-buttons 164 (FIG. 2) light the bank of indicator lamps 166 in binary code. For example, if only the top two lamps are lit, the vehicle is destined for station "1."

In addition to the thirteen stations, there is a general code (the top one and bottom two lamps lit) which indicates that a vehicle on the track is unoccupied and, therefore, may be switched onto any spur line where an empty vehicle is required. At the car barn 108 (FIG. 1), a "general" vehicle is switched into storage.

Another code (only the top and bottom lamps lit) is inserted into the bank of indicators 166 by servicemen who periodically inspect the vehicles. For example, assuming that a vehicle has a badly worn tire, an inspector inserts a key in a lock and locks the door. Simultaneously with the locking, a suitable sign lights above the door such as "Please Use Next Gondola." Also, the first and fifth lamps in bank 166 light to indicate the need for maintenance.

Yet another code is an idle one (only the top one lamp lights). Thus, after a passenger alights from a vehicle, its doors shut automatically and close a switch to light the first lamp in the bank 166. When a passenger enters a vehicle and pushes a key 164, this idle indication is changed to another code.

Finally, an emergency code appears when no lamp is lit. An emergency condition may arise from a failure detected by instruments located on the vehicle or by failure of the lamps to light. In either event, it is an indication that the vehicle is in emergency condition and must be removed from the track, as soon as possible. In fact, the vehicle should not be allowed to go to the car barn 108 under its own power—that condition is indicated by a "maintenance" code signal.

Station code.—The circuitry of FIG. 23 is arranged to operate a switch at the station indicated in FIG. 24 as station 11 (i.e. all lamps, except the second, in the indicator bank 166 are lit). More particularly, at the instant when a vehicle displaying a station "11" code is passing the photoelectric cells and contacts 147a (FIG. 4) close (indicating the physical presence of a car), there is an output signal from the photoelectric cells "1," "3," "4," and "5" as indicated by FIG. 24. Since there is no output from the photoelectric cell "2," the inverter 421 applies a signal to its output conductor. Thus, by inspection of FIG. 23, it is seen that there is coincidence at the five input terminals of an "AND" gate 422. The output of "AND" gate 422 feeds through an "OR" gate 423 to operate a memory or flip-flop circuit 424 to the state opposite the state shown, and through an inhibit gate 425, and an "OR" gate 426 to operate a flip-flop circuit 427 to give a "1" output on the "0" side. This "1" output switches the vertical switch of FIG. 9 to deflect the vehicle displaying the station "11" code from the main track to a spur track. As this vehicle travels down the decline track, it passes a wayside detector 147a after it clears the switch. A signal from this detector resets the flip-flops 424, 427, 447 to their original state, thus returning the switch to its normal position so that succeeding cars will remain on the main line track.

General code.—Next, assume that additional vehicles are required at station "11" to serve a sudden influx of passengers. The circuitry of FIG. 25 energizes the lower input of an "AND" gate 428 (FIG. 23) as explained below. The upper input of "AND" gate 428 is fed from a five-input "AND" gate 429 when a vehicle displaying a general code appears on the track, i.e. its bank of indicators 166 (FIG. 2) reads 10011. The "AND" gate 428 conducts and applies a signal to operate the flip-flop circuit 427 and the associated switch, thus deflecting the vehicle with the "general" marking onto the spur track at station "11."

Emergency code.—Another condition which could require the switch at station "11" to operate arises when a vehicle on the main line develops an emergency condition. For example, if a bearing overheats, an instrument causes all lamps on the bank 166 to go out as an emergency signal. This emergency code is the only time that the first indicator lamp is dark, thus it should be apparent that if the first lamp is dark the lit or unlit conditions of the remaining lamps are immaterial. The all lamps dark condition is the emergency signal normally used. The glass reed relay contact 147a (FIG. 4) positioned along the track adjacent photoelectric cells 420 operates when the vehicle is correctly located. The photocell "1" should be reading a signal from a lit indicator lamp, but in this emergency condition, there is no light signal, and the inverter 431 applies a signal to the upper input of an "AND" circuit 432. A coincidence, therefore, occurs between the output of the inverter 431 and the car detector 147a which causes the "AND" gate 432 to conduct. The output of gate 432 is applied through the "OR" gate 423, inhibit gate 425, "OR" gate 426, and flip-flop 427 to operate the vertical switch. After the emergency vehicle is emptied of its passengers, it may be placed on a truck and carried away to car barn 108 (FIG. 1) for repair.

The vehicle doors automatically close after any vehicle is emptied and the bank of indicator normally lights in the idle code, i.e., "10000". The vehicle then moves forward onto the loading platform and works its way into the launch position as indicated in FIG. 8. At the launch position, reader 165 reads the bank of indicators and sends a signal to the circuitry in the lower right-hand corner of FIG. 19. Also, while the vehicle is waiting at the launch position, its actuator 148 (FIG. 2) operates a glass reed contact 443 (FIG. 23) located on the track.

Obviously, at least the first lamp in bank 166 should be lit at launch time whether the vehicle is or is not occupied. If the first lamp is not lit, the vehicle is in emergency condition, and the inverter 440 is not energized from photocell 441. An output signal is, therefore, applied from inverter 440 to an "AND" gate 442 simultaneously with the signal from the glass reed contacts 443. The "AND" gate 442 conducts and, via an "OR" gate 444, inhibits the inhibit gate 425 to prevent operation of the associated switch and prevent any other car from entering this station until this emergency situation is rectified. Also, since no reservation signal is sent to FIG. 19 because all lamps in bank 166 are dark, no time slots are reserved, and the vehicle remains on the spur track at station "11". In addition, an alarm 445 is sounded by the output of "AND" gate 442 so that appropriate action may be taken by servicemen. However, the exact nature of this action is not material to this particular invention.

*Switch forwarding signal.*—If the spur line of an indicated station is filled, a circuit 449 operates to energize "OR" gate 444. This circuit 449 derives its information from the car count circuit FIG. 25. When circuit 449 (FIG. 23) operates, a signal feeds through "OR" gate 444 to inhibit the inhibit gate 425, thus preventing light signals on the indicator bank 166 from having effect on the switch control circuit.

Under these conditions, when a vehicle cannot be switched onto a spur track, a problem arises as to what should be done to serve the passengers who expect to— but cannot—get off at the full station. The invention contemplates several procedures. First, the vehicle may continue to go around the main loop track until the room becomes available. In one exemplary system, a total trip around the main loop is four minutes; therefore, a passenger is not inconvenienced too much if required to make one extra trip. Of course, there is a possibility that the passenger may have to make many such trips as when a stalled vehicle prevents a spur line from emptying, for example. This would not be good. Therefore, a second procedure is to operate a switch at the next succeeding station, thus switching the vehicle onto the spur line at that station and forcing the passenger to walk back one stop. Either way, there are passenger inconveniences.

The circuitry of FIG. 23 provides a compromise by which the first vehicle to encounter a full condition at its indicated station is sent around the main loop, and the second vehicle in succession to find that same station full is switched onto the spur line at the next station. Thus, in the usual cases, the passenger will only be required to ride around the main loop one extra trip because statistics prove that, with a spur line of adequate length for normal traffic patterns, a vehicle normally will have left the spur line during the time required for one such trip. On the other hand, in the unusual situation, as where disabled equipment precludes launch at a way station, a second successive failure to switch automatically forwards all future vehicles bearing a station "11" indication into the next station "12".

To forward vehicles to the next station, the output of the "OR" gate 423 sets a first flip-flop circuit 424 to the state opposite that indicated when any station "11" vehicle reaches photoelectric cells 420. Normally, that same vehicle enters the spur and resets the flip-flop 424 as it passes the decline detector 147a. However, if conditions are such that the switch cannot operate, the decline detector 147a does not operate, and the flip-flop 424 does not reset. The next station "11" vehicle passing the photocells 420 causes a second signal to appear at "OR" gate 423 and operate the flip-flop 424 back to the original state shown in FIG. 23. This pulses a second flip-flop 447 which switches it to give a "1" output at its "0" side and sends a signal to enable the next station's code detector to accept a car with station #11 code. Thus, the second successive vehicle bearing the station "11" designation, "10111", that fails to enter station "11" is switched into the next station "12". When the switch at station "11" does next operate, decline detector 147a resets both flip-flops 424, 447, and the switch control circuit (FIG. 23) returns to normal operation.

A feedback circuit including "OR" gate 450 holds flip-flop 424 switched so that it will not switch back with the next station "11" vehicle. Thus, only a signal from detector 147a will reset the flip-flops.

*Manual operation.*—Yet another condition may occur when the cars are manually controlled from the control panel of FIG. 12. That is, when a dispatcher advances a vehicle at the lowest speed (10% torque) by use of hand tool 240 (FIG. 14c), a light on the control panel indicates that the vehicle is at a switch. At this point, the dispatcher pushes a manual control button 448 individually associated with the switch indicated by the lit lamp. This button feeds a signal through the "OR" gate 426 to the flip-flop circuit 427 to operate the switch. The disabled vehicle is then driven down the spur line under the manual control of the dispatcher using hand tool 240.

CAR COUNT CIRCUIT

The final electrical circuit required to control the point-to-point transit system shown herein is that used to select the maximum and minimum number of vehicles allowed on any spur line at any given time. This selection is made responsive to a manual control of the switch shown in FIG. 15. This car count circuit is claimed in a co-pending application entitled "Bidirectional Counter" Serial No. 173,163, filed February 14, 1962, by Anthony Midis and assigned to the assignee of this invention.

The minimum and maximum switches 252, 253 of FIG. 15 are shown in the lower left-hand and in the upper central portions of FIG. 25. Thus, if a dispatcher moves the "MIN" switch 252 to indicate "3", the contacts 470 close (FIG. 25) and the "MAX" switch 253 to "7", the contacts 471 close. While three contacts are shown in association with each of these switches, it should be understood that any number of contacts may be provided.

FIG. 25 also includes a detector 472 which is tripped each time that a vehicle enters the associated spur line and a detector 473 which is tripped each time that a vehicle leaves the associated spur line. Again, these detectors may be glass reed contacts located along the track.

Responsive to a pulse from detector 472, a first flip-flop 474 flips to the state opposite that shown. An output "1" from the "0" side feeds through a KT (timing delay) circuit 475 after a period of time sufficient to ensure against double circuit operation by one vehicle. That is, the KT circuit 475 does not put out a signal to energize the lower input of a first "AND" gate 476 until after a vehicle has completely passed over the detector 472 and its glass reed contacts have opened. The next vehicle entering the spur track closes detector contacts 472 and applies a signal to the upper input of the "AND" gate 476. This signal coincides with the output of KT circuit 475, "AND" gate 476 conducts, and a second flip-flop 477 switches states. After elapse of another period of time, the KT circuit 478 conducts to energize the lower input of a second "AND" gate 479. The process continues as each vehicle enters the spur track.

Assume that the dispatcher sets the switch 253 to close contacts 471. The seventh vehicle on the spur line causes the "AND" gate 479a to conduct, and the resultant current through an "OR" gate 480 causes a general code to be inserted into a vehicle showing an idle code in the launch position and move out onto the main line track. If any other station has a pending request for vacant vehicles, this general marked vehicle is switched onto the appropriate spur track; otherwise it is sent into storage at car barn 108 (FIG. 1).

As each car is launched from the way station onto the main line, launch detector 473 sends a pulse into a subtracting circuit. To understand this feature, assume that four vehicles are at the loading platform and that one is launched. From the foregoing, it is apparent that the first three flip-flops 474, 477, 481 have been switched to give an output "1" on their "0" sides and all remaining flip-flops are standing in their normal state. Thus, when the launch detector 473 operates, a pulse is sent through the lower input terminals of the first eight (counting from right to left) "AND" gates shown in the lower right-hand portion of FIG. 25. The "AND" gate 482 does not conduct because flip-flop 481 is in its state opposite to that shown, i.e. the upper input terminal of gate 482 is not energized. However, the output of the eighth "AND" gate 483 resets the third flip-flop 481 to its original state. After a period of time measured by a KT circuit 484, the upper input of the ninth "AND" gate 482 is energized.

Assume that the dispatcher moves the "MIN" switch 252 to close contacts 470 and indicate that a minimum of three vehicles are required. A signal is fed from "AND" gate 483 through the switch 470 and an "OR" gate 486 to the "CAR REQUEST" circuit of FIG. 23, and also to a storage control circuit at car barn 108. Responsive thereto, the next vehicle on the main line track bearing a "general" designation is switched onto the spur line track at the requesting station. If a vehicle does not enter the spur line within a fixed time period, a vehicle bearing the "general" code marking is launched onto the main line track at car barn 108. Thus, a general vehicle will be available to the requesting station within a four or five minute period required to travel from the vehicle storage area onto and around the main loop track.

It is to be understood that the foregoing description of a specific embodiment of the invention is not to be construed as a limitation upon its scope.

We claim:
1. An electrical control system for a transportation system comprising a fixed path, electrically conductive means for effectively dividing the entirety of said path into electrical control areas, means for recurringly energizing each of said conductive means to provide time division control slots which sweep across said path, and means responsive to electrical command signals in said time division slots of at least some of said moving areas for controlling the position of objects running on said path.

2. An electrical control system for controlling the speed and position of objects moving over a fixed path, means for causing electrical command signals to sweep over said path at a fixed rate of speed, said signals having fixed discrete positions with respect to each other and means responsive to said command signals for causing said objects to lock to said command signals whereby said object moves over said path at said fixed rate and at said fixed discrete positions with respect to each other.

3. An electrical control system for a point-to-point transportation system comprising a track, means for effectively dividing said track into discrete electrically moving control areas, and means responsive to command signals moving with at least some of said control areas for controlling the position of vehicles running on said track to have discrete intervals with respect to each other.

4. The electrical control system of claim 3 there being at least two of said command signals in each of said control areas, means responsive to one of said command signals for controlling the speed of said vehicles, and means responsive to another of said command signals for commanding the application of braking forces to said vehicles.

5. An electrical control system for a transportation system comprising a predetermined path over which a plurality of self-powered vehicles run, means including a source of running time slots for effectively dividing said path into moving control areas of discrete lengths, and means responsive to command signals in said time slots for locking the position of said vehicles into said control areas, whereby said vehicles run at the speed of said running control areas and at fixed positions with respect to each other.

6. An electrical control system for a transportation system comprising a series-parallel track, said series track including a first closed loop main line track and an interconnected second closed loop main line track for providing transportation between a plurality of way stations, said parallel track including a plurality of spur line tracks, one of said spur line tracks being located at each of said way stations, means comprising a source of electrically moving control areas for controlling vehicular motion on said closed loop tracks, and means for reserving a first plurality of said control areas for controlling vehicular motion on said first loop and a second plurality of said control areas for controlling vehicular motion on said second loop.

7. The control system of claim 6 wherein said vehicles are self-powered, means responsive to command signals in said control areas for locking the positions of said vehicles into a particular segment of said control area whereby each of said vehicles move around said closed loop main line track at a fixed rate of speed set by the rate at which said control areas run.

8. The control system of claim 6 and means for effectively increasing the speed of said moving control areas on said second loop after said moving areas leave said interconnection, and means for effectively slowing the speed of said moving control areas on said second loop just before said moving areas return to said interconnection.

9. An electrical control system for a transportation system comprising a segmented trolley line, means responsive to signals applied to vehicles on said trolley line via said segmented buses for controlling the speed or braking of vehicles adjacent said bus, means on said vehicles for driving said vehicles over an adjacent segment during a fixed time period, and means controlled by the length of said trolley line segments for controlling the speed of said vehicles.

10. An electrical control system for a point-to-point transit system comprising a series-parallel track on which individually self-powered vehicles suspended beneath said track run, whereby zones exist in which possible collisions may occur between the top of a vehicle on one of said parallel tracks and the bottom of a vehicle on the other of said parallel tracks, at least three trolley lines running along the length of said track, one of said trolley lines being a continuous bus, and the remaining two of said trolley lines being segmented buses for effectively dividing said track into electrically moving control areas, means on said vehicles for detecting signals appearing on said three trolley lines adjacent the positions of said vehicles, means responsive to signals appearing on said trolley lines for providing at least three speed control areas at the beginnings and ends of each parallel section of said track, means at the speed control area nearest the junction of a series and a parallel section of a track for commanding an increase in the speed of vehicles entering said parallel track, said increase of speed being selected to maintain a constant linear vehicular speed relative to said series track throughout the length of said collision zone, means at the speed control area immediately following said collision zone for commanding an incrementally reducing vehicular speed, and means at a speed control area following the speed reduction area for commanding said vehicle to stop.

11. The control system of claim 10 wherein the length of said bus segments is selected to correspond to the rate at which trolley line signals are to take effect, means responsive to signals applied to said vehicle via one of said segmented buses for controlling the speed or braking of said vehicles, and means responsive to signals applied from said vehicles to another of said segmented buses for controlling the spacing between said vehicles to prevent rear end collisions.

12. An electrical control system for a series-parallel rail track, point-to-point transit system said series track comprising an elevated closed loop main line rail track for providing transportation between a plurality of way stations, said parallel track comprising a plurality of vertically switched spur line rail tracks, there being one spur line located at each way station, a plurality of self-powered vehicles suspended beneath said rail to run on said tracks, thus causing a possible collision zone wherein the top of a vehicle on said parallel track might collide with the bottom of a vehicle on said series track, means comprising at least three trolley lines running along the length of said track for controlling the speed and positions of said vehicles on said track, a first of said trolley lines being a continuous bus, and the remaining two of said trolley lines being segmented buses for applying individual signals to said vehicles when said vehicles are on the section of said track adjacent a segment of said buses, and means responsive to said signals on said trolley lines and controlled by the length of said bus segments for providing at least four speed and position control areas on said track to start, stop, run, and prevent collisions between said vehicles.

13. The control system of claim 12 wherein a first of said speed control areas comprises a first track section adjacent said trolley line where said bus segments have a uniform relatively long length for commanding a uniform speed of the vehicles running on said first track section, a second of said speed control areas comprises a second track section extending throughout the length of said collision zone adjacent said trolley line where said bus segments have an increased length for commanding an increase of vehicular speed throughout said collision zone, a third of said speed control areas comprises a third track section extending beyond said collision zone adjacent said trolley line where said bus segments have a decreasing length for commanding an incrementally reducing vehicular speed, and a fourth of said speed control areas comprises a fourth track section extending beyond said reducing speed area adjacent said trolley line where said bus segments have a uniform relatively short length for commanding said vehicles to move at inching speeds.

14. In an electrical control system for a trolley line transit system wherein a possible collision zone exists at each switching point, means including a uniformly segmented trolley line bus for maintaining a uniform vehicular speed on a main track, and means reponsive to an incremental lengthening of said trolley line bus segments for commanding an increase in the speed of vehicle on spur tracks adjacent said main track at least throughout the length of a collision zone for vehicles on said main and spur tracks, said increasing length of said segments being selected to correpond to the hypotenuse of a triangle having an adjacent side of said uniform length, the angle between said hypotenuse and said adjacent side being the same as the angle between said main track and said spur track at the point where the hypotenue segment is located.

15. In an electrical control system for vehicles riding on a series-parallel track including at least two joined main loop tracks, the combination comprising; means including a uniform length, segmented trolley line bus running along said tracks of one main loop for maintaining a uniform vehicular speed on said one main line track, means including an incremental lengthening of said trolley line bus segments along one portion of the other of said main tracks for commanding an increase in the speed of vehicles leaving said one main line loop, and means including an incremental shortening of said trolley line bus segments along another portion of said main track for commanding a decrease of the speed of vehicles reentering said one main line loop, said increasing and decreasing lengths of segments near the junction of said loops being selected to correspond to the hypotenuse of a triangle having an adjacent side of said uniform length, the angle between said hyptoenuse and said adjacent side being the same as the angle between the tracks of said two loops at said junction.

16. The electrical control system of claim 5 and a source of cyclically recurring pulses for providing running electrical control areas which sweep over said trolley line bus segments at a fixed speed, means controlled by said source for applying A.C. command signals of selected frequencies to successive ones of said bus segments, means responsive to the frequency of said command signals appearing on the bus segment adjacent said vehicle for controlling the speed of the vehicle adjacent that bus, and means responsive to an absence of any A.C. signal on said segment of said bus adjacent said vehicle for applying the brakes to that vehicle.

17. An electrical control system for a transit system comprising a plurality of self-powered vehicles, a main track, time slot means for dividing said main track into discrete segments by a series of running electrical control area signals which sweep over said track at a predetermined rate of speed, means for locking self-powered vehicles into track position with respect to each other responsive to said control area signals so that said vehicles run over said track at said predetermined rate of speed separated by discrete intervals corresponding to said segments, a spur track, a booster, and means responsive to the detection of a vacant one of said running time slot control area signals for connecting said booster to accelerate a vehicle standing on said spur track to said predetermined speed and into said vacant time slot.

18. The control system of claim 17 and means including a segmented trolley line bus for incrementally increasing the speed of said vehicle while on said spur track to the speed at which said control areas run on said main track whereby said vehicle is launched onto said main track in said vacant time slot at the predetermined speed at which said control signals sweep over the track.

19. The control system of claim 17 and means responsive to signals from said standing vehicle for transmitting a slot reservation signal to seize said vacant time slot, means responsive to said slot reservation signal for searching over said running control area signals sweeping over said main track into track areas adjacent a predetermined number of preceding way stations, and means at each of said preceding way stations for giving preference to said slot reservation signal at that station before passing said reservation signal back to the next preceding station.

20. An electrical control system for a series-parallel, point-to-point rail transit system comprising a main track for interconnecting a plurality of way stations, each of said way stations having a loading platform adjacent a spur track parallel to said main track, means including a source of recurring time slots for effectively dividing said main track into electrically moving control areas, means responsive to command signals in some of said time slots for controlling the speed of vehicles running on said track whereby said vehicles occupy said control areas as they sweep along said track, means at each of said stations for reserving a vacant time slot defined control area on said main track, and means responsive to completion of said reservation of said vacant control area for launching a vehicle onto said main track in said reserved control area.

21. An electrical control system for a point-to-point transit system comprising a series-parallel track on which self-powered vehicles run, a bank of external indicating means distributed along each of said vehicles for indicating the destination of said vehicles, means distributed in juxtaposition with said bank of indicators for operating a switch at a parallel section of said track identified by said bank of indicators, means for counting each vehicle entering or leaving said parallel track, means responsive to the count reaching a predetermined maximum for preventing other vehicles from entering the parallel track where said count reached a maximum, and means responsive to said count reaching a predetermined minimum for shunting vacant vehicles onto said parallel track where said count reached a minimum.

22. The control system of claim 21 and means comprising recurring time slots for controlling the position of vehicles on said track, a booster, means for detecting a vacant position on said track for connecting a booster to one of the vehicles for launching said one vehicle from said parallel track to a main line track at a predetermined speed, and means responsive to the launching of said vehicle onto said main track for subtracting a vehicle from said count.

23. An electrical control system for a rail transportation system comprising at least one segmented trolley line bus running along the length of said track, means for selectively applying speed control signal to said bus segments, means on said vehicle for driving said vehicle over said rails at the speeds fixed by said control signals, the lengths of said segments being selected to correspond to a desired speed, an acceleration, or deceleration pattern, at least one continuous trolley line bus being provided in addition to said segmented bus, and means including a D.C. signal superimposed upon an A.C. signal selectively applied to said bus segments for controlling vehicular speed on said rails.

24. The control system of claim 23 and means on each vehicle comprising a series of filter circuits connected across said continuous and segmented buses for separating the D.C. and A.C. signals and for separating the A.C. signals by frequency.

25. An electrical control system for a rail track transportation system comprising a plurality of vehicles for running on said rails, time division control means for controlling the speed and position of vehicles on said track, a control panel having a track layout thereon corresponding to the rails of said transportation system, means on said panel including a plurality of vehicle status indicators individually associated with positions of said rail and said track layout, said indicators indicating the positions of said vehicles on said rails in said transportation system, and means at said control panel for overriding said time division control and advancing any selected one of said vehicles over said rails responsive to command signals manually applied at said control panel.

26. The electrical control system of claim 25 and means including a segmented trolley line bus running along said rail for controlling vehicular motion in said system, said means for applying manual control signals comprises segmented control buses in said control panel layout, each segment of the control buses being individually connected to a corresponding one of said trolley line bus segments, and means comprising a hand tool at said panel for selectively applying command signals to said vehicles through said control buses extending from said control bus segments into said trolley line bus segments.

27. An electrical control system for a rail system including an elevated closed loop main line track for providing transportation between a plurality of way stations, a parallel rail track including a plurality of spur lines, there being one spur line located at each way station, a plurality of self-powered vehicles adapted to run on said tracks, said tracks including a control track composed of a succession of insulated segments, means for providing a plurality of time slot signals for controlling the driving of each of said vehicles around said main line track at a fixed rate of speed, said time slots including a sequence of three signals applied successively to groups of three insulated segments of said control track, a first of said signals being made available to cause a speeding vehicle to slow down toward the fixed rate of speed, a second of said signals being made available to cause said vehicle to operate at the fixed rate of speed, and a third of said signals being made available to cause a too-slow vehicle to speed up toward the fixed rate of speed, means comprising a bank of indicators on the outside of each of said vehicles and selectively operated from within said vehicles for giving an external indication of the point of destination of each individual vehicle, means at each of said way stations for reading said external identification means, and means responsive to said last named means for operating a switch at the way station identified by said indicator means.

28. The electrical control system of claim 27 wherein said bank of indicators comprises a plurality of electromagnets distributed along said vehicle and said way station reading means comprises a number of stationary magnetically controlled glass reed contacts distributed in juxtaposition with selected ones of said electromagnets when said vehicle is adjacent said reading means, said glass reed contacts being interconnected to correspond to the numerical identification of the way station where the contacts are located.

29. The electrical control system of claim 27 wherein said bank of indicators comprises a plurality of lamps distributed along one side of said vehicle, and said way station reading means comprises a number of stationary photoelectric cells distributed in juxtaposition with selected ones of said lamps when a vehicle is adjacent said reading means, said photoelectric cells being interconnected to correspond to the numerical identification of the way station where the contacts are located.

30. An electrical control system for a series-parallel, rail track, transportation system, said series track comprising an elevated closed loop main line track for providing transportation between a plurality of way stations, said parallel track comprising a plurality of vertically switched spur lines, there being one spur line located at each way station, a plurality of self-powered vehicles adapted to run on said tracks, means comprising at least two trolley lines running along the length of said track for controlling the positions of said vehicles on said track, a first of said trolley lines being a continuous bus, and another of said trolley lines being a segmented bus for applying individual signals to said vehicles when said vehicles are on the section of said track adjacent a segment of said bus, the length of said trolley bus segments being selected to correpond to a desired speed or acceleration or deceleration pattern of vehicular motion, means comprising a plurality of time slots signals for driving each of said vehicles around said closed loop main line at a fixed rate of speed, said last named means comprising means for selectively applying command signals to successive ones of said trolley bus segments responsive to said time slot signals, means on the outside of each of said vehicles and selectively controlled from within said vehicles for giving an external indication of the point of destination of the vehicles, means at each of said way stations in juxtaposition with said external indicating means for reading said external identification means, and means responsive to said last named means for operating the switch at the way station identified by said external identification means.

31. The electrical control system of claim 30 and a control panel having a track layout thereon corresponding to the main line and spur line tracks, a plurality of vehicle status indicators individually associated with positions on said track layout corresponding to the positions of said segmented bus for selectively indicating the position of each vehicle in said transportation system, and means at said control panel for selectively advancing any selected one of said vehicles responsive to command signals manually applied at said control panel.

32. The electrical control system of claim 31 wherein said means for applying manual control signals comprises a segmented control bus running along the track layout in said control panel layout, each segment of the control bus being individually connected to a corresponding one of said trolley line bus segments, and means for selectively applying command signals to said vehicles from said control panel through said control bus segments into said trolley line segments.

33. The control system of claim 30 and means for individually selecting maximum and minimum numbers of vehicles which may stop at any given time at any given way station, and means for shunting vacant vehicles onto each of said spur lines and launching vacant vehicles off said spur line to provide said maximum or minimum number of vehicles at said way station.

34. The electrical control system of claim 30 wherein said command signal means comprises means for applying at least three speed control signals to said bus segments, means responsive to a first of said speed control signals nearest the leading edge of each of said time slots for commanding a slow vehicle speed, means responsive to at least a second of said speed control signals following said first control signal for commanding a normal vehicle speed, and means responsive to at least a third of said speed control signals following said second control signal for commanding a slow vehicle speed.

35. An electrical control system for a rail system comprising means including a source of time slot signals for effectively dividing said rail into electrically moving control areas, means responsive to command signals controlled by at least some of said time slot signals for controlling the speed of vehicles running on said rail, means responsive to command signals controlled by at least some other of said time slot signals for controlling the braking of said vehicles running on said rail, there being at least three of said speed command signals controlled by said time slot signals, means responsive to a speed command signal controlled by a leading time slot signal for commanding a slow vehicle speed, means responsive to a speed command signal controlled by a following one of said time slot signals for commanding a normal vehicle speed and means responsive to a speed command signal controlled by a second following said time slot signal for commanding a fast vehicle speed.

36. An electrical control system for a point-to-point rail system comprising a track on which a plurality of self-powered vehicles run, at least three trolley line buses running along the length of said track, one of said trolley lines being a continuous bus, and the remaining two of said trolley lines being segmented buses for effectively dividing said track into electrically moving control areas, the length of said segments being selected to correspond to the speed, or acceleration or deceleration pattern with which vehicle command signals are to take effect, means on said vehicle for detecting signals appearing on said trolley line buses adjacent said vehicles, means jointly responsive to signals applied to said vehicles via one of said segmented buses and to signal detecting means on said vehicles for controlling the speed or braking of said vehicles, and means responsive to signals applied to another of said segmented buses from said vehicles for controlling the spacing between vehicles to prevent rear end collisions.

37. The control system of claim 36 and means controlled by cyclically recurring time slot signals for applying A.C. command signals of selected frequency to successive ones of said segments of said one segmented bus.

38. The control system of claim 37 and means on said vehicle controlled responsive to the frequency of said A.C. command signals for selecting the speed of said self-powered vehicle.

39. The control system of claim 37 and means responsive to an absence of said A.C. command signal for applying brakes to the vehicle then adjacent that segment of said one bus having no A.C. signal.

40. The control system of claim 39 wherein said means for preventing rear end collisions comprises means controlled by signals applied to the other segmented buses from said vehicle for selectively removing said A.C. command signals from all segments of said one segmented bus for a predetermined distance behind each vehicle.

41. An electrical control system for a rail system comprising a series parallel track on which self-powered vehicles run, a bank of external indicating means distributed along one side of each of said vehicles for indicating the destination of said vehicle, way station reading means distributed in juxtaposition with selected ones of said bank of indicators for operating a switch at a parallel section of said track identified by said bank of indicators, means for counting each vehicle entering or leaving said parallel track, means responsive to the count reaching a predetermined maximum for preventing other vehicles from entering the spur line track where said count reached a maximum, and means responsive to said count reaching a predetermined minimum for shunting vacant vehicles onto said spur line track where said count reached a minimum.

42. The control system of claim 41 and means comprising time slot signals for controlling the position of vehicles on said track, a booster, means responsive to the detection of a vacant one of said time slots for connecting a booster to said vehicle for accelerating said vehicle from said spur tracks located at each way station, said spur tracks mined speed, and means responsive to the launching of said vehicle onto said main track for subtracting a vehicle from said count thereby completing said count of said vehicles leaving said parallel track.

43. An electrical control system for a series-parallel track, a point-to-point transportation system comprising a plurality of vehicles, means including a main line track for providing transportation for said vehicles between a plurality of way stations, means including a plurality of spur tracks located at each way station, said spur tracks being parallel to said main line track and having a switch at each end thereof for switching said vehicles onto and off said parallel branches, means comprising a bank of indicators on the outside of each of said vehicles for giving an external indication of the point of destination of said vehicle, means at each of said switches for reading said external identification means, means responsive to said last named means for operating a switch at a first way station identified by an external identification of said first station if the spur track at that way station has room for another vehicle, means for counting the number of times that said switch fails to operate in response to said external identification indicating that switch, and means responsive to a predetermined number of successive failures of said switch to operate at a point identified on said bank of indicators for operating a switch at another of said way stations.

44. An electrical control system for a series-parallel, point-to-point rail transit system comprising a main track for interconnecting a plurality of way stations, each of said way stations having a loading platform adjacent a spur track parallel said main track, means including a source of time slot signals applied to said vehicles via multi-line trolley line buses running along said track for effectively dividing said track into electrically moving control areas, means responsive to command signals controlled by some of said time slot signals for controlling the speed of vehicles running on said track, means at each parallel section of said track for effectively changing the length of said control areas on one branch of said parallel track sections to control the speed of said vehicles while on said parallel track section, means at said way station responsive to controls on said vehicle for scanning for a predetermined potential on at least one of said trolley lines adjacent said tracks near said way station, and means responsive to detection of a moving control area said predetermined potential for reserving that control area.

45. The control system of claim 44 wherein said predetermined potential is applied to said one line by a shunt circuit carried by said vehicle and connected across two of said trolley buses.

46. An electrical control system for a series-parallel, point-to-point rail system comprising a closed loop main track for interconnecting a plurality of way stations, each of said way stations having a loading platform adjacent a spur track parallel to said main track, means including a master shift register for providing a source of time slot signals for effectively dividing said main track into electrically moving control areas, means comprising a slave register driven from one step of said master register for dividing said time slots into at least two categories, means responsive to command signals controlled by some of said time slot signals for controlling the speed or braking of the vehicles running on said track whereby said vehicles occupy said time slots as they sweep along said track, means at each parallel section of said track for detecting the destination said vehicles on that parallel section of track, and means responsive to said detecting means for selectively launching said vehicles on said parallel section of track into a vacant time slot having a predetermined category.

47. The system of claim 46 and means comprising a booster for accelerating vehicles from said spur track onto said main track at a fixed speed, a track detector means for coordinating the position of a vacant time slot sweeping along said track with the time required to start said booster, and means for starting the acceleration of a vehicle by said booster responsive to a coincidence of a predetermined step of said master shift register, an output of said coordinating detector means, and the detection of a vacant time slot.

48. In an electrical control system for vehicles riding on a series-parallel track, the combination comprising; means including a uniformly length segmented trolley line bus running along said tracks for maintaining a uniform vehicular speed on a main line portion of the track, the speed of said vehicles varying with the length of said bus segments, means including an incremental lengthening of said trolley line bus segments along one branch of said parallel portion of the track for commanding an increase in the speed of vehicles on said one branch, a source of cyclically recurring time slot signals, means controlled by said time slot signals for applying A.C. command signals of selected frequencies to successive ones of said trolley line bus segments, means in said vehicle controlled responsive to the frequency of said command signals appearing on the segment of said bus adjacent said vehicle for controlling the speed of that vehicle, means on each of said vehicles for detecting its position on said track, and means selectively responsive to said detecting means for interpreting the meaning of said A.C. command signals according to the location of said vehicle on said track.

49. The electrical control system of claim 48 wherein said increasing lengths of said trolley line bus segments are selected to correspond to the hypotenuse of a triangle having an adjacent side of said uniform length, the angle between said hypotenuse and said adjacent side being the same as the angle between said main line track and said parallel track.

50. An electrical control system for a rail transportation system comprising a track for interconnecting a plurality of way stations, means comprising at least one segmented trolley line bus running along said track, means including a shift register for providing a series of output signals defining running time slots for effectively dividing said track into electrically moving control areas, a plurality of sources of A.C. signals, each source providing a different A.C. frequency, means for selectively connecting said sources to said trolley line bus segments in response to the output signals of said shift register, said connections being made to cause said A.C. signals to sweep over said track at a fixed speed, means responsive to the frequency of said signal on said trolley line segments for controlling the speed of vehicles running on said track adjacent said segments, and means on each of said vehicles of changing the effect of said A.C. signals on said vehicle speed in accordance with the position of said vehicle on said track.

51. The control system of claim 50 and means comprising at least one wayside detector for indicating when said vehicle passes over a predetermined section of said track, and means responsive to operation of said detector for changing the effect of said A.C. signals on said vehicle speed.

52. An electrical control system for a point-to-point transit system comprising, a main track, means for dividing said main track into a series of electrically running control areas, means responsive to the detection of a vacant one of said running control areas for connecting a booster to accelerate a vehicle standing on a spur track to a predetermined speed, and means for incrementally increasing the speed of said vehicle while on said spur to the speed at which said control areas run on said track whereby said vehicle is launched onto said main track in said vacant control area and at the speed at which said control area runs.

References Cited by the Examiner

UNITED STATES PATENTS

| | | | |
|---|---|---|---|
| 1,762,507 | 6/1930 | Custer | 104—149 X |
| 1,837,605 | 12/1931 | Barker | 214—16.4 X |
| 2,194,057 | 4/1940 | Simpson | 104—88 X |
| 2,581,552 | 1/1952 | O'Hagan et al. | 246—2 |
| 2,828,480 | 3/1958 | Golladay | 246—63 X |
| 3,045,112 | 7/1962 | Hailes | 246—63 |
| 3,118,392 | 1/1964 | Zimmerman | 104—88 |

FOREIGN PATENTS

| | | |
|---|---|---|
| 546,572 | 7/1942 | Great Britain. |
| 867,045 | 4/1961 | Great Britain. |

ARTHUR L. LA POINT, Primary Examiner.

LEO QUACKENBUSH, Examiner.

S. B. GREEN, Assistant Examiner.